US008825697B2

(12) United States Patent
Foresti

(10) Patent No.: US 8,825,697 B2
(45) Date of Patent: Sep. 2, 2014

(54) METHOD AND SYSTEM TO CAPTURE, SHARE AND FIND INFORMATION AND RELATIONSHIPS

(75) Inventor: Stefano Foresti, Denair, CA (US)

(73) Assignee: Stefano Foresti, Denair, CA (US)

( * ) Notice: Subject to any disclaimer, the term of this patent is extended or adjusted under 35 U.S.C. 154(b) by 0 days.

(21) Appl. No.: 13/615,340

(22) Filed: Sep. 13, 2012

(65) Prior Publication Data

US 2013/0297645 A1   Nov. 7, 2013

Related U.S. Application Data

(60) Provisional application No. 61/534,203, filed on Sep. 13, 2011, provisional application No. 61/595,693, filed on Feb. 7, 2012.

(51) Int. Cl.
*G06F 17/30* (2006.01)
(52) U.S. Cl.
CPC .... *G06F 17/30477* (2013.01); *G06F 17/30864* (2013.01)
USPC .......................................... 707/769; 707/694
(58) Field of Classification Search
USPC ............................ 709/234; 713/170; 345/661
See application file for complete search history.

(56) References Cited

U.S. PATENT DOCUMENTS

| | | | | |
|---|---|---|---|---|
| 2005/0216452 A1* | 9/2005 | Teague | .............................. | 707/3 |
| 2007/0192420 A1* | 8/2007 | Vaughn | ........................ | 709/206 |
| 2007/0208941 A1* | 9/2007 | Backer | .......................... | 713/170 |
| 2007/0255530 A1* | 11/2007 | Wolff | ............................. | 702/187 |
| 2009/0228370 A1* | 9/2009 | Shakkarwar | ..................... | 705/26 |
| 2011/0012929 A1* | 1/2011 | Grosz et al. | ................... | 345/661 |
| 2012/0311329 A1* | 12/2012 | Medina et al. | ................ | 713/168 |
| 2012/0311686 A1* | 12/2012 | Medina et al. | ..................... | 726/7 |
| 2013/0103814 A1* | 4/2013 | Carrasco et al. | .............. | 709/223 |

* cited by examiner

*Primary Examiner* — Anteneh Girma

(57) ABSTRACT

A method and system to improve personal and collaborative information management and search. The method is to actively or passively capture pieces of information and the connections among them across disparate technologies and the human mind, while people keep working with familiar tools, and to snapshot such information objects to be globally addressed, persistent in time, and hyperlinked based on the connections. The system can be injected in existing digital information technology (servers and the cloud or personal and mobile computing devices) to capture, connect, share, synchronize, search and serve the information objects and their connections. This is particularly effective in finding information that is buried and disorganized across devices, applications, internet accounts, and people, or information and connections in the users' mind and actions that otherwise do not get captured in digital form.

10 Claims, 36 Drawing Sheets

| when | what | who | Xid |
|------|------|-----|------|
| 🕐 | ● | ● | 4T&w |
| 🕐 | • | ● | T$*a |
| 🕐 | ● | ● | Ou)& |
| 🕐 | ● | ● | CV#0 |
| 🕐 | • | ● | GIU8 |

| when | PId1 | PId2 |
|---|---|---|
| ⊙ | E8rH | a@z.com |
| ⊙ | PT2a | jb@fb |
| ⊙ | T@a | a@b.com |
| ⊘ | T@a | a@c.com |
| ⊙ | PT2a | OpenID24 |
| ⊙ | joe@a.com | joe@b.com |

METHOD AND SYSTEM TO CAPTURE, SHARE AND FIND INFORMATION AND RELATIONSHIPS

CROSS-REFERENCE TO RELATED APPLICATIONS

This application claims benefit of U.S. Provisional Patent Application Ser. No. 61/534,203, filed Sep. 13, 2011. It also claims benefit of Provisional Patent Application Ser. No. 61/595,693, filed Feb. 9, 2012. Those prior applications are hereby incorporated by reference.

BACKGROUND

With the explosion of information and apps, it is ever harder to find and understand information in context. This includes the following scenarios in collaborative information management:
 1. finding information we have seen or thought in the past,
 2. understanding sources and details of what we did or is shared with us,
 3. accessing confidential information, and
 4. reusing others' information with the tools we want.

Digital information surely can not be found if it was lost or not captured in first place. Improving search technology is not enough, because there are root problems that make information very hard to find. First, while humans think of relationships among pieces of information, these may be hard or impossible to get captured with current apps: very important input from humans gets lost. Second, digital information gets replicated and scattered around devices, apps, accounts, and people, resulting in the loss of important relationships among who-what-when.

State of the art information technology (IT) works as here explained and shown in FIG. 1. While our mental ideas contain relationships among bits and pieces of information, the new info we create with apps fails to capture those relationships, and instead replicates existing info with no trace to its origins. We share in three ways: messages, groups, and public. A message is the easiest way to share what I want exactly with whom I want; however, messages can't be tracked, and may be forwarded to unintended recipients. Group sharing is good for predefined groups of people, but it's too rigid: in reality, groups and objectives may be dynamic, creative, unstructured, and involuntary. Last, the public web lets the whole world access the info.

BRIEF SUMMARY OF THE INVENTION

The solution here presented, which is embodied in a system called xap.io, is based on 1) Protocol, 2) User Interfaces (UI), and 3) Software:

1) Protocol for global object identification with permission intention (Xid). The solution is based on treating any captured information object as immutable when saved, and creating a global unique persistent ID for such object (Xid), which can be used to serve URIs (e.g. http://xap.io/Xid or www.anydomain.com/Xid). The captured object metadata include timestamp, identity of its creator, and the creator's permission intention (a list of person IDs or Xids that can or must not find). The protocol is the basis of XMetabase that is in effect a "notary system" that can be consulted for future search and access to objects.

2) Software for devices and cloud. The software components (Xdaemon and XMetabase) install on servers and clients (personal devices) to render them part of a notary system of immutable objects. XMetabase is the notary that contains events of object creation (Xid, what, when, who, for whom, where it is). Xdaemon has these jobs:
 a. capture operating system events of common user actions (select, copy&paste, drag&drop, insert, open, save, save as, etc.);
 b. snapshot selected clipboard content, source files, source URLs, and screen grabs;
 c. generate Xids/URIs for the snapshots, and modify the clipboard adding the source hyperlink (so that the modified clipboard can be pasted in the editor of any app);
 d. assign the user set permission for each object, based on who can or must not find;
 e. interact with other Xdaemons in the cloud server to arrange which metadata and/or objects to sync;
 f. interact with the local OS to manage the immutable objects in local storage;
 g. perform local searches in metadata or files, upon request by the Xdaemon on a server.

It is important to notice that the components 2) a-c make the system transparent to users, providing a leap in benefits while using familiar apps and environments, resulting in a frictionless and clean experience and easy adoption.

3) User Interface. The user interfaces (UIs) can work across devices with multiple screen sizes: the goal of the UIs is to provide complementary functions to the passive capture in the workflow. The UIs support active capturing and hyperlinking among bits and pieces of information, setting permissions for them, searching and viewing them. The UI allows to connect existing structures (such as files, folders, etc.) or bits and pieces of info in the display (paragraphs, screen grabs, etc.) based on the operations supported by the OS (select, drag&drop, copy&paste, insert, menus etc.). Each user-selected object is assigned an Xid (unless previously Xid-captured) and hyperlinked transparently (not embedded or replicated) from the "new idea" that the user is editing. When the new idea is saved an Xid is assigned too. As a result, the new idea is a "webified" object that hyperlinks to the objects that were used (which also get Xids). For each "what" the user decides: who can find it, whom to send it to, and who must not find. When the author saves/sends, the Xap.io system generates an Xid for that object so that the Xap.io metabase knows who will be able to find or view such object (either as a result of a search, or clicking on a hyperlink in view). As a result, I (as any user) can search or navigate through all Xids that are permitted to me. Once I have proven that I'm the owner of identities (email addresses, phone numbers, government issued ID, OpenID, postal address, username on internet services, etc.) my permitted information space includes all those objects whose permission list includes one of such IDs.

This system and methods include human and technological factors to solve the IT problems:
 1. Frictionless: first and foremost, the solution has to be injected in existing IT in a frictionless manner: people can keep using familiar tools to get benefits, without being asked to change habits or learn new tools.
 2. "Capture the moment": connections among pieces of disparate information across apps and the human mind shall be captured before they get permanently lost.
 3. Global: a unique permanent ID (URI) gets assigned to each user captured information item to be globally identifiable and fetched.
 4. Eternal: the captured item shall be an immutable snapshot in time, so it can be found in the future exactly as it was in the past.

5. Controlled: the users are in control to determine who can access each of their own items. By injecting this system, the existing IT can be transformed to work as shown in FIG. 2:

Supply:
create information reusing and linking disparate pieces of data in display;
each piece is transparently "webified" (a global ID/URI is assigned); the source of such piece is also webified and hyperlinked;
for each info created, users have the option to decide who else can find it and . . . must not find it!

Demand:
Users find any information they have access to;
Users can find information by searching what-when-who and navigating through hyperlinks;
Users have also the incentive and means to reuse and connect info, instead of replicating or recreating . . . the liquid and accountable marketplace with privacy goes on . . . .

Here we summarize why and what benefits derive from the adoption of this technology for users, operators, and society.

Search. By increasing the information captured in digital form and the connections in our minds or actions, the likelihood to find information increases substantially, because it can be done via keyword searches or navigating through the network graph of information.

Provenance. By facilitating users to hyperlink to existing information, rather than replicating it in new containers (files, folders, hard drives, apps) along with making objects immutable and globally addressed will increase the likelihood and shorten the time to determine provenance.

Privacy. The ability for users to select "who can find what" on the fly at a fine grain, combined with keeping the "what" immutable will provide users with increased privacy over data they produce, and confidentiality for business.

Tracking. By transparently "webifying" data (thus pulled), along with the immutability of captured objects will help users track how the info they produce now will be used in the future.

Openness. The webification of data within users' devices will create an alternative to the current trend of centralized storage in cloud services and advertising business models, which result in walled gardens and privacy confusion around user data. By facilitating data portability across technologies, people will be free to use apps and storage of their choice across data.

Network efficiency. By facilitating users to hyperlink to existing data, rather than duplicating in other containers (files, folders, devices, etc.) will help to balance the sharing model in favor of "pull" (search) instead of today's reliance on "push" (messages). One of the benefits deriving from "pull" is that network storage and bandwidth get used more efficiently.

Reduced overload. The ability to ubiquitously search or navigate through any information that has been permitted to us will help us finding and viewing only what we need now, and reduce our "inbox overload".

Collective intelligence. Making it easy to create, share, and find information across technologies, and to connect disparate and unstructured information, will increase collaboration and collective intelligence. The ability to perform searches beyond personal or public data, navigating the broad web of information that was shared with us will increase intelligence production further.

DESCRIPTION OF THE DRAWINGS

FIG. 19 illustrates possible scenarios of permissions.

FIG. 27 illustrates the search of related objects to the objects in view: linked, similar, or people.

FIG. 31 illustrates the model for the object creation table of Xmetabase.

FIG. 33 illustrates the model for the object location table of Xmetabase.

FIG. 35 illustrates the model for the object equivalence table of Xmetabase.

DETAILED DESCRIPTION

Capture and Immutable Webification

Figure 1:
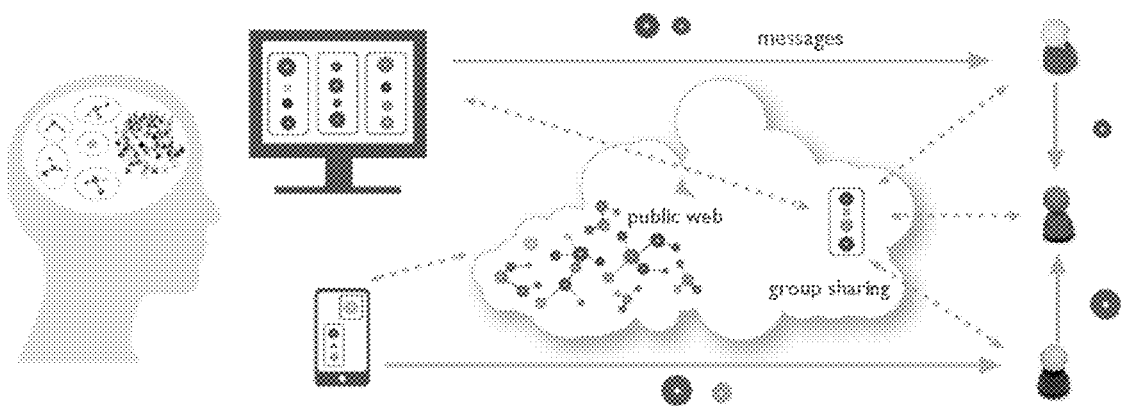
FIG. 1 illustrates the status quo of information technology: relationships among information in our mind get lost, while digital information is replicated losing the trace of who did what when.
Figure 2:
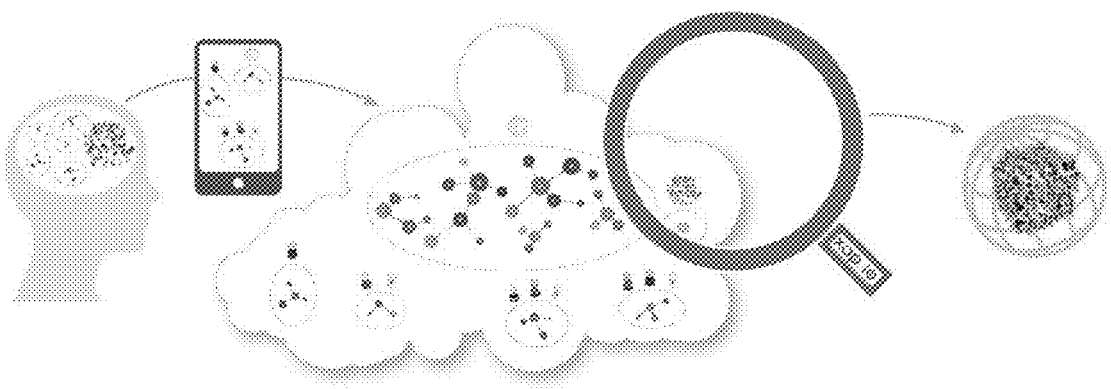
FIG. 2 illustrates information technology with the injection of this invention: pieces of information across devices apps and people are captured, connected based on our ideas, and are findable by who was permitted.
Figure 3:
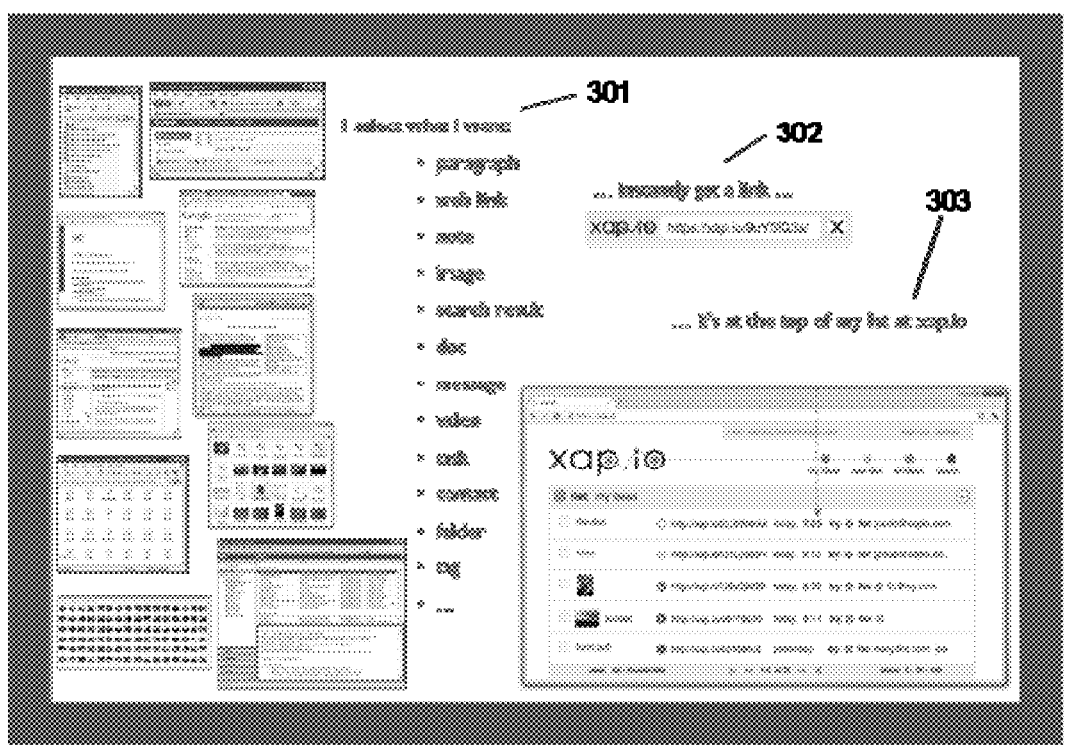
FIG. 3 illustrates an embodiment of immutable webification in a large display such as a personal computer and monitor with a one click selection.
Figure 4:
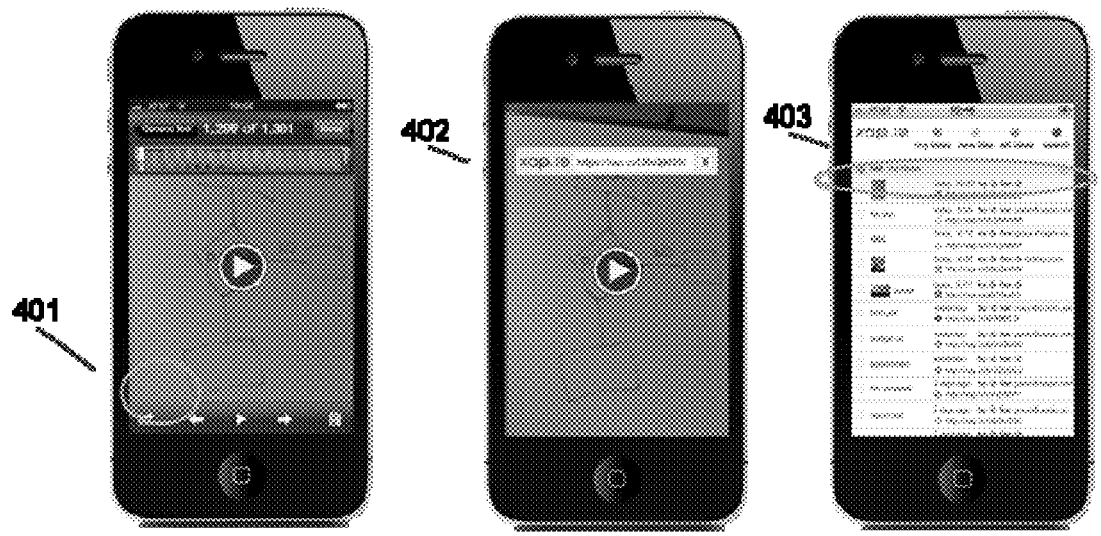
FIG. 4 illustrates an embodiment of immutable webification in a small display such as smart phone with a one click selection.
Figure 5:
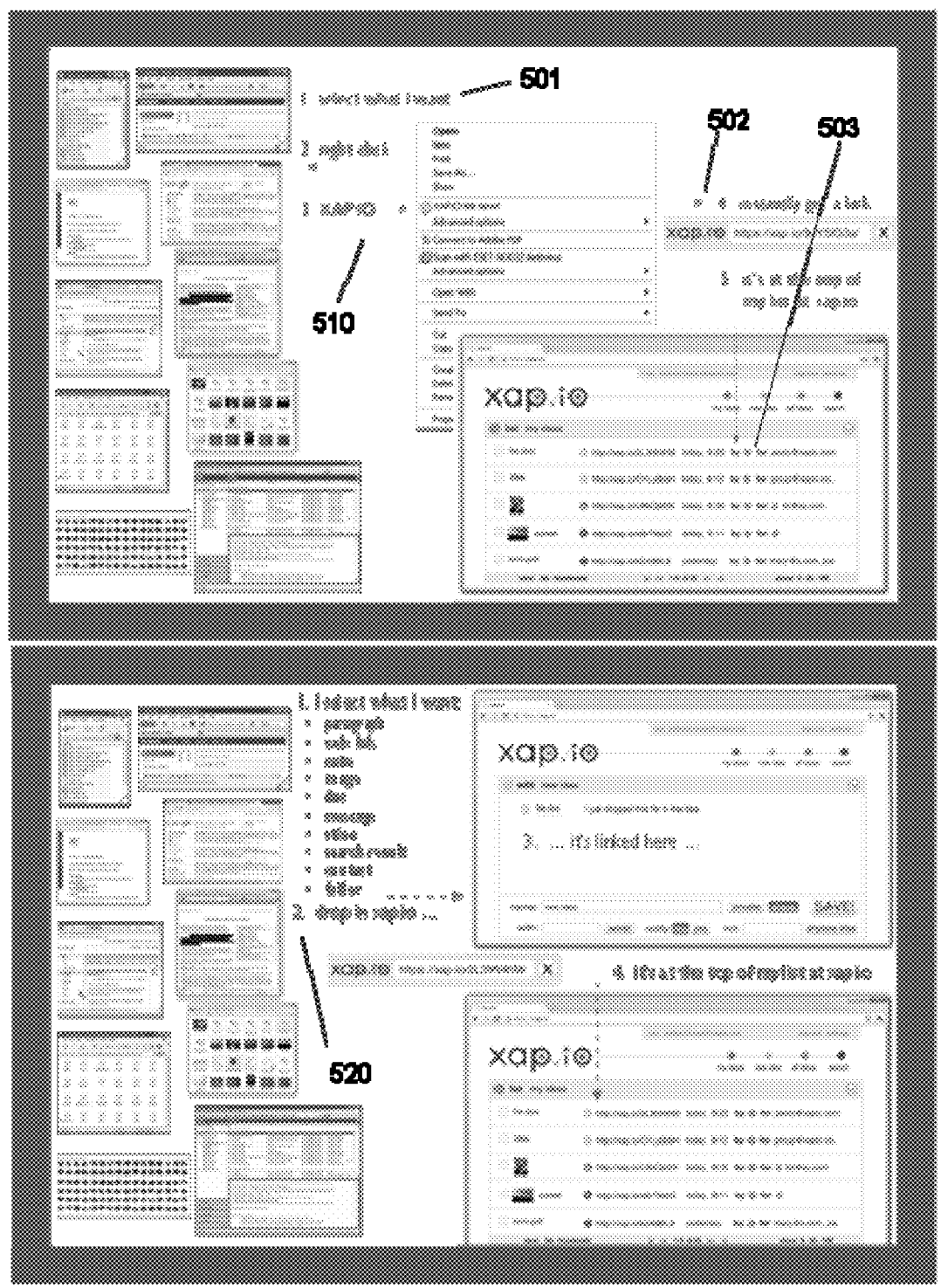
FIG. 5 illustrates immutable webification in other possible embodiments: with menu selection, copy or drag.

The foundation of the system is what I call "immutable webification". Referring to FIG. 3, any bit or piece of info I select in any type of display 301 instantly picks up a globally unique and persistent identifier (Xid) and web address (URI) 302: it's a permanently webified snapshot. Example of bits or pieces of information I can select: paragraph, web link, note, image, doc, part of the screen, message, video, audio clip, video clip, video frame, search result, task, contact, folder, tag, etc. The webified snapshot may be stored in the device and synced on the cloud service. It's immediately available in "mine" 303 the index of all my captured snapshots in Xmetabase. If retrieved later, it will be unchanged. Actions that trigger the immutable webification may include selecting an object such as one in the list described above and 301 and 401, drag&drop or copy&paste in another object, selecting and picking one action in a pop-up menu, pressing a button in the device, etc. An embodiment of immutable webification is shown in FIG. 3 in a large display such as a personal computer, and another embodiment in a small display such as a mobile phone is shown in FIG. 4. By tapping the display 401 the screen is selected, and the screen capture picks up a globally unique and persistent identifier (Xid) and web address (URI) 402, which is available in "mine" and the xap.io Xmetabase 403. Other possible embodiments are shown in FIG. 5, where a selection occurs with a menu 510, or a drag or copy 520. Other possible embodiments include selecting information in a browser environment, display wall, or an immersive environment.

Connect Pieces of Info Across Apps

Figure 6:
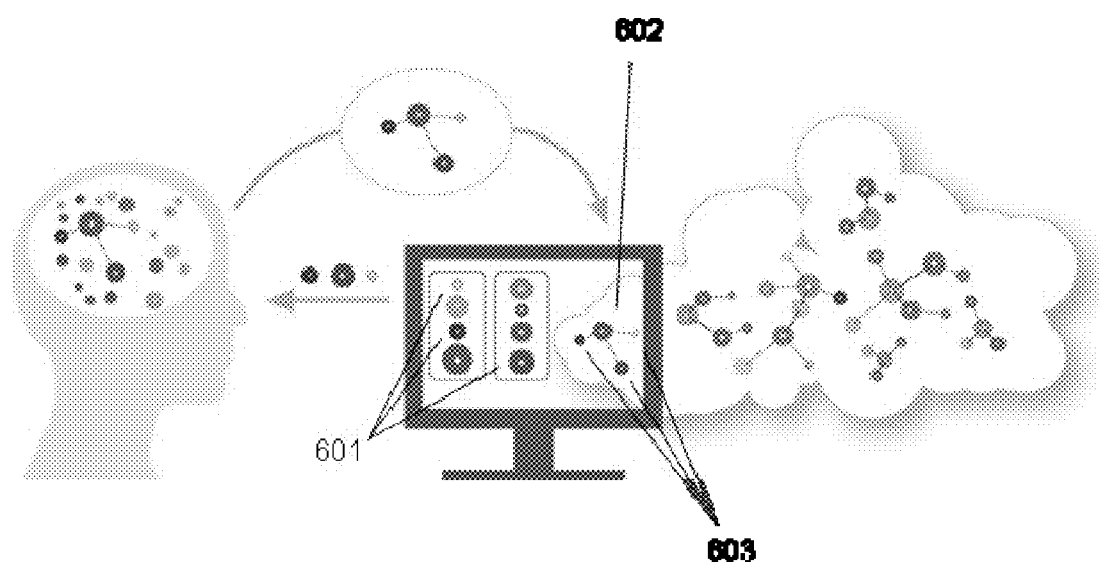
FIG. 6 illustrates connecting disparate pieces of information based on our ideas, so that they are immediately immutably webified and hyperlinked.

The conceptual model of connecting disparate bits and pieces of information like ideas, so that they are immediately "webified" and hyperlinked to the new idea is shown in FIG. 6.

The user interface is conceived to work across devices with multiple screen sizes: it allows to connect existing structures (such as files, folders, etc.) or chunks of info in the display (paragraphs, screen grabs, etc.) based on the operations supported by the OS (select, drag&drop, copy&paste, insert, menus etc.). Each selected object 601 is immutably webified 603 (assigned an Xid, unless previously Xid-captured) and hyperlinked transparently (not embedded or replicated) from the "new idea" 602. When the new idea is saved 602, it is also immutably webified. As a result, the new idea 602 is a web addressed object that hyperlinks to all objects 603 that were used (which are also web addressed). All these objects are instantly available in the Xmetabase, in "mine", and linked to each other. They are immutable and persistent (changing an item creates a new version, with a new Xid).

Figure 7:
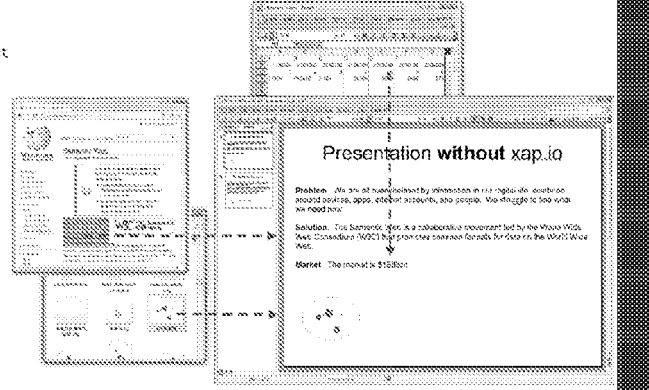
FIG. 7 illustrates the result of passive connection (webification and hyperlinking) on a personal computer with xap.io enabled, compared to the same actions respectively without it (status quo).
Figure 7:
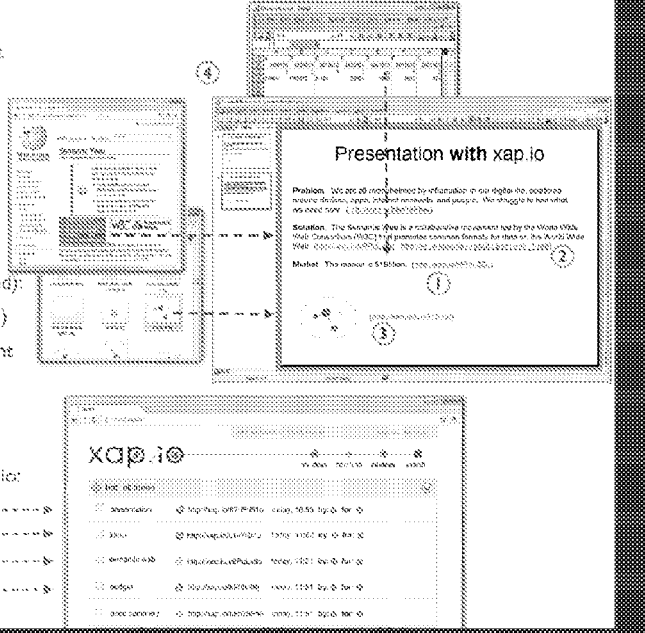
Figure 8:
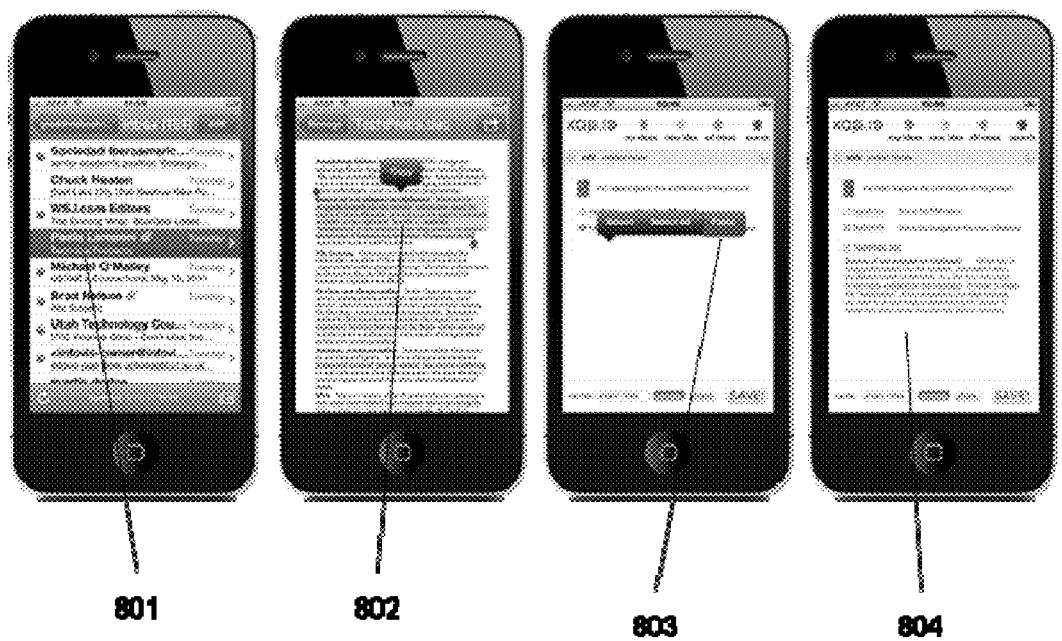
FIG. 8 shows passive connection in a mobile phone.
Figure 8:
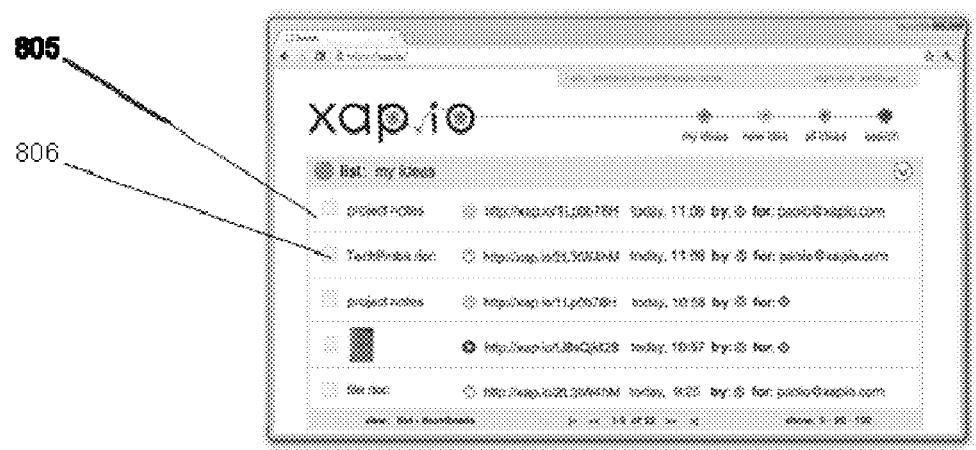
Figure 9:
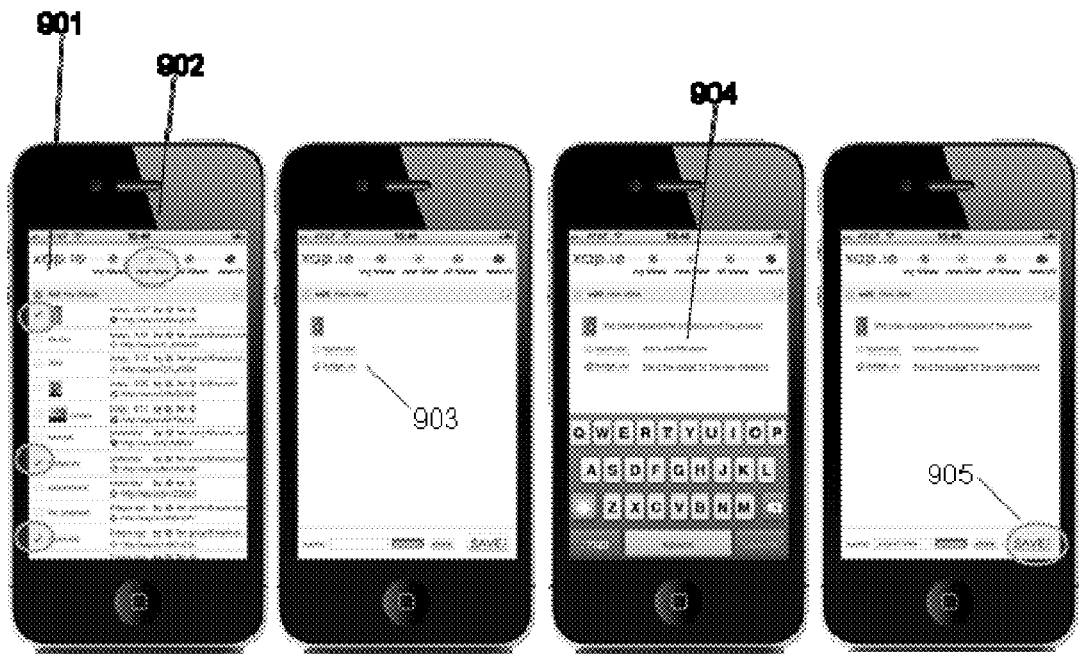
FIG. 9 illustrates active connection in a mobile phone.
Figure 10:
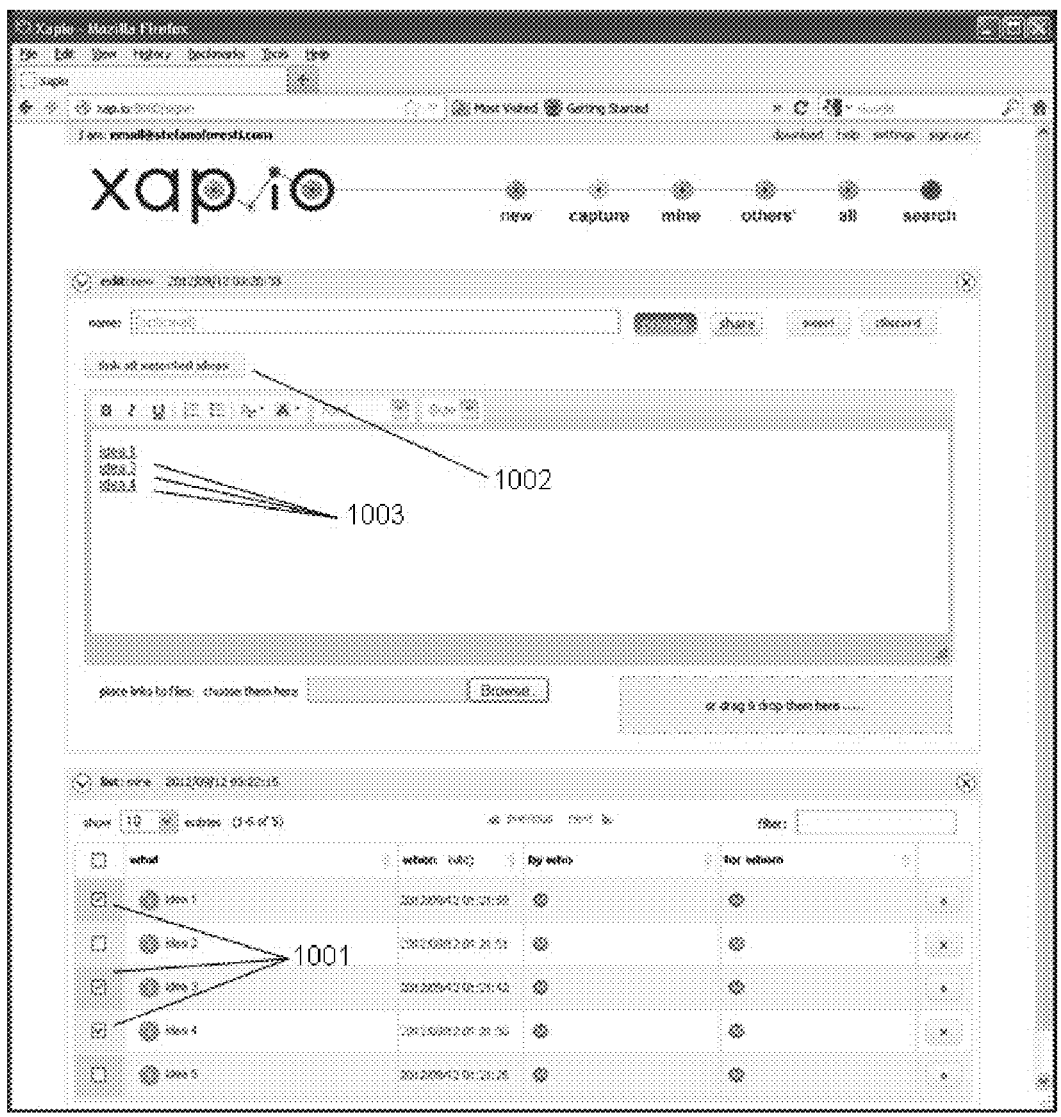
FIG. 10 illustrates active connection in the browser.

This system enables to connect multiple pieces of info:
  passively: working on typical apps as described in the scenario in FIG. 7 or 8:
  actively: explicitly connecting in the system user interface as shown in the FIGS. 9 and 10.

More precisely, FIG. 7 shows what happens when the user does exactly the same actions, first in the status quo, and then with the xap.io system installed on the device. The description of the actions to compare what happens in the status quo and xap.io is within the image. The process and options of what happens with capture and connect with xap.io is further explained in FIGS. 12-14.

FIG. 8 shows a scenario on a mobile phone, where copying a paragraph in an application will result in pasting the content hyperlinking to the object where it was copied.
  1. I check a list of messages and attachments 801
  2. I copy text from a file 802
  3. I paste elsewhere 803
  4. the text that I had copied hyperlinks to file where it was copied. 804
  5. Meanwhile, in the browser (on any device) I can see in my account:
    the file where I copied from was webified transparently to me, and the pasted text hyperlinks to it 805
    the newly created object along with linked sources are webified snapshots in list of ideas 806

Existing structures (such as files, folders, etc.) or chunks of info in the display (paragraphs, screen grabs, etc.) can be connected based on the operations supported by the OS (select, drag&drop, copy&paste, insert, open, save, save as, etc.):
  each of them picks up a globally unique, persistent ID (Xid), and then used to build a URI (http[s]://[domain][syntax][Xid]);
  each of them is immediately available in "mine", my list of captured objects (with an optional name);
  they are hyperlinked from the new object I am editing.

FIG. 9 shows actively connecting in a mobile phone: selecting objects 901 in a xap.io list, and clicking to connect them in an idea 902 triggers editing an idea with the hyperlinks to said objects 903. The idea can then be edited around the hyperlinks 904, and saved 905.

FIG. 10 shows a similar action to actively connect objects into ideas in the browser: some objects are selected in a list 1001, and by using the link action in an idea 1002, those objects are hyperlinked in it 1003.

Passive Capture and Connection

This section shows in more detail what happens when the Xdaemon is installed and runs on a personal computing device, such as a PC or a smart phone.

Figure 11:
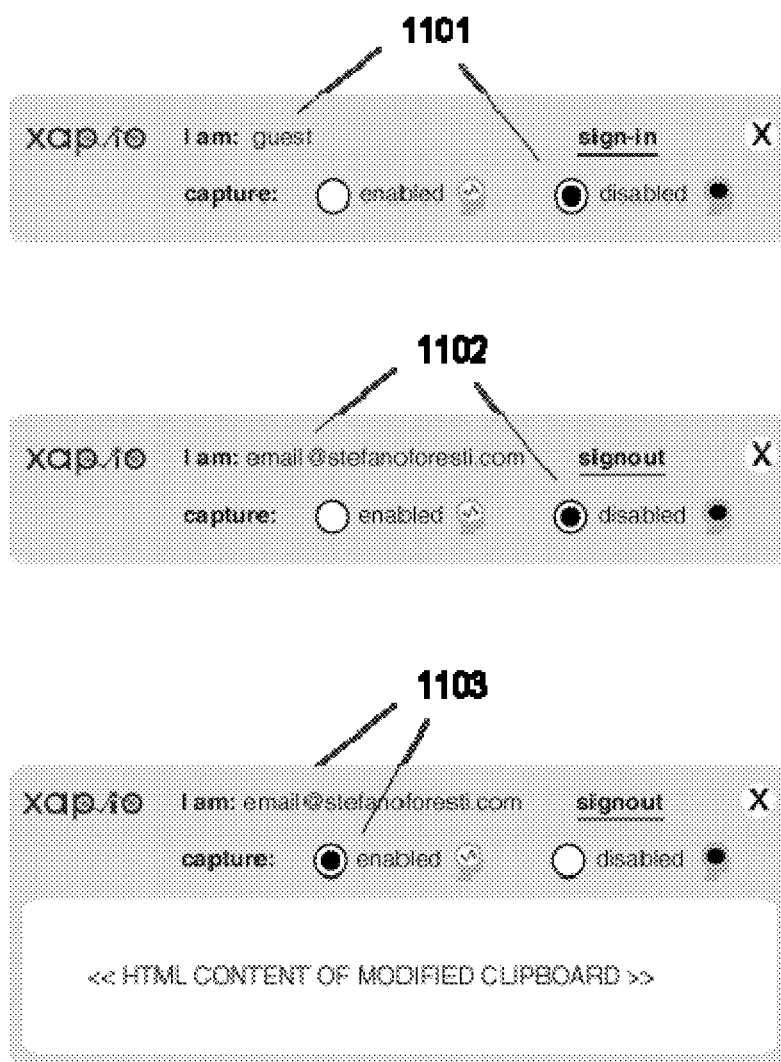
FIG. 11 shows the states of the Xdaemon and related user interface.

These acronyms are used: XAUT, for the Xdaemon client automation, XSRV for the xap.io server with Xdaemon, and USER, for authenticated user in xap.io that performs a user action. FIG. 11 shows the states of the Xdaemon states and related user interface (GUI).

Authentication.

If USER was already signed in xap.io, then XAUT connects to XSRV account from the cookie. If the user was not signed in xap.io (guest), then the capture is disabled.

Capture Status GUI.

The Xdaemon starts a xap.io capture GUI that may or may not be enabled by the user, but it is used here to describe what happens to content in the process of content capture and connection. FIG. C1 describes the states of the Capture Xdaemon.

Signed out—disabled 1101. This is the GUI when the user is signed OUT of xap.io. The xap.io capture functionality is disabled. If the user clicks either "sign-in" or the radio button for "enabled", the xap.io sign-in page in the browser is launched. If the user signs in, then the xap.io capture gets linked to that account (e.g. via cookie). In this case, xap.io does not modify the standard behavior, so no capture and connect with webification and clipboard modification.

Signed in—disabled 1102. This is the GUI when the user is signed IN xap.io, but the xap.io capture functionality is disabled. This happens when the user has selected "disabled", or when the user has just signed in the browser. When the user signs in xap.io, the GUI is brought to the forefront on the desktop. The possible actions are to enable (which changes the status to the 3-), and to sign out). In this case, xap.io does not modify the standard behavior, so no capture and connect with clipboard modification, no uploads, etc.

Signed in—enabled 1103. This is the GUI when capture is enabled. In this case, with capture functionality enabled, there is an area where the HTML/RTF of the modified clipboard is displayed. Each time that a new clip is done, the modified content is refreshed.

Overall Functionality when the Xap.io Capture is Enabled.

When the capture functionality is enabled, the Xdaemon detects user actions in applications and files including:
- open or save a file in an application (e.g. MS Word)
- copy file(s) from a folder
- copy text from Browser, (e.g. Firefox)
- copy text from a file or application (e.g. Acrobat)
- paste modified clipboard with clickable links in RTF or HTML editor
- paste modified clipboard with unclickable links in an application text editor
- paste modified clipboard with clickable links in an application editor Save File.
- These are the actions:
- USER works in application (e.g. Powerpoint)
- USER saves file (via save, save as, CTRL-S, etc.)
- XAUT captures and saves a copy of the file at that moment and generates Xid/URI
- USER has in xap.io account the saved file (with permission=private).

Copy Files.
- These are the actions (FIG. 12):
- USER selects file(s) 1201
- USER copies (via copy, CTRL-C, etc.) 1202
- XAUT captures and saves file(s) to xap.io at that moment and generates Xid/URI (s)
- XAUT modifies the clipboard with RTF so that it contains the filenames+URI(s) 1204
- USER has in xap.io account the saved file (s) (with permission=private). 1203

Notice that this may happen regardless of whether the user pastes afterwards or not. When USER does a paste into some other location in the device UI (e.g. an application with editor) the clipboard is modified to add to the existing content the URI(s):

| | |
|---|---|
| in a browser app with RTF editor: | filename(s) clickable to filepath(s) |
| in a browser app with text editor: | filename [filepath] (s)-unclickable |
| in device app (e.g. MS Word): | filename(s) clickable to filepath(s) |

Figure 12:
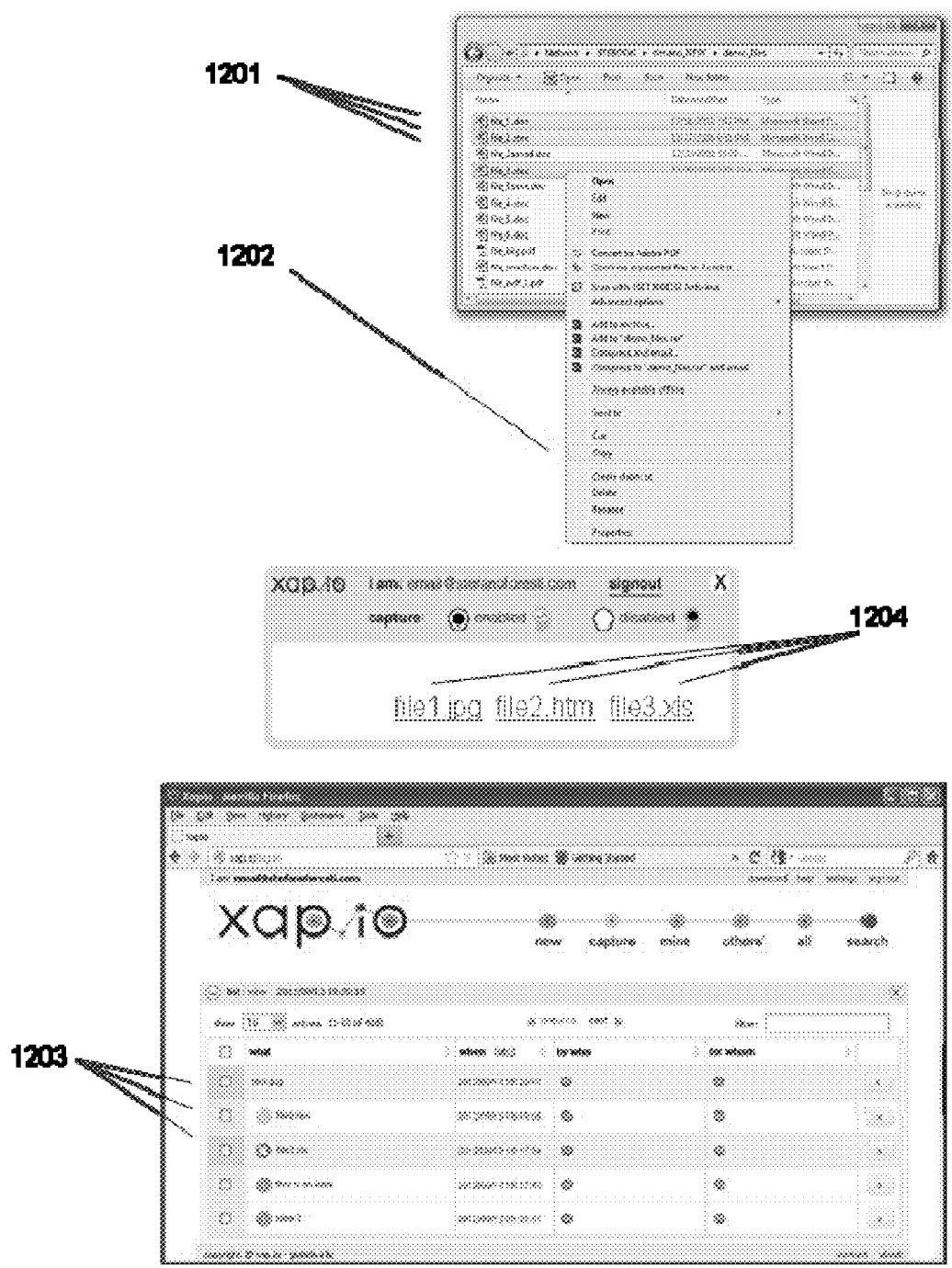
FIG. 12 shows the details of passive connection when files are copied from a folder.

FIG. 12 shows what happens when 3 files are copied from a folder on a PC.

1. Select file1.jpg+file2.htm+file3.xls in a folder 1201 and copy 1202
2. In the user account in xap.io there are 3 new files (regardless of pasting) 1203.
3. The Xap.io GUI contains this HTML with the hyperlinks to the files 1204

4. In case user does a clipboard paste, the pasted content is:

| |
|---|
| Paste in RTF/HTML editor: file1.jpg file2.htm file3.xls |
| Paste in Text editor: file1.jpg [http://xap.io/filepath1] |
| file2.htm[http://xap.io/filepath2] file3.xls [http://xap.io/filepath3] |

Copy a Selection of Content in the Browser.

When USER selects text or a whole section of objects displayed in the browser, the following happens, as described in FIG. 13.
- USER selects content in browser: <content> 1301
- USER copies (via click, copy, CTRL-C etc.)
- XAUT obtains from XSRV (or generates locally in XAUT) a xap.io URL "xap.io/show?capt-id" for the HTML of this capture with references
- XAUT modifies the clipboard for pasting elsewhere as follows:

| | |
|---|---|
| Text editors: | <copied text> [http://xap.io/show?capt-id] |
| RFT/HTML editors: | <copied text> [xap.io/show?capt-id] |

At this point the clipboard is ready even if the files are not uploaded yet
- XAUT determines the originating URL in the browser 1302, say variable origpath (e.g. www.nytimes.com/ . . . )
- XAUT shoots a screengrab of the browser window
- XAUT obtains from server (or generates locally) a xap.io URL scrnpath (xap.io/show?scrn-id) for the screengrab
- XAUT uploads on xap.io the browser's "title of web page".png (along with the scrn-id if generated locally) 1303
- XSRV receives "title of web page".png (and scrn-id if generated locally) and associate them
- XAUT saves a HTML file of the content in the browser that corresponds to the current URL
- XAUT obtains from server (or generates locally) a xap.io URL pagepath (xap.io/show?html-id) for the web page
- XAUT uploads on xap.io the browser's "title of web page".html (along with the page-id if generated locally)
- XSRV receives "title of web page".html (and page-id if generated locally) and associate them
- XAUT creates an HTML file "xap.io capture clip" or "the first N characters of text of the copied content" which is the capture with sources as follows: 1304
    <copied text>[source: origpath][screen: scrnpath][page: pagepath]
- XAUT uploads on XSRV the file capture.html (and capt-id if generated locally)
- XSRV receives capture.html (and capt-id if generated locally) and associate them
- XSRV displays capture.html in the frame triggered by "capture button"

In case the user does a Paste following the copy the clipboard to be pasted is modified as in 1305:

| | |
|---|---|
| Text editors: | <copied text> [http://xap.io/show?capt-id] |
| RFT/HTML editors: | <copied text> [xap.io/show?capt-id] |

Figure 13:
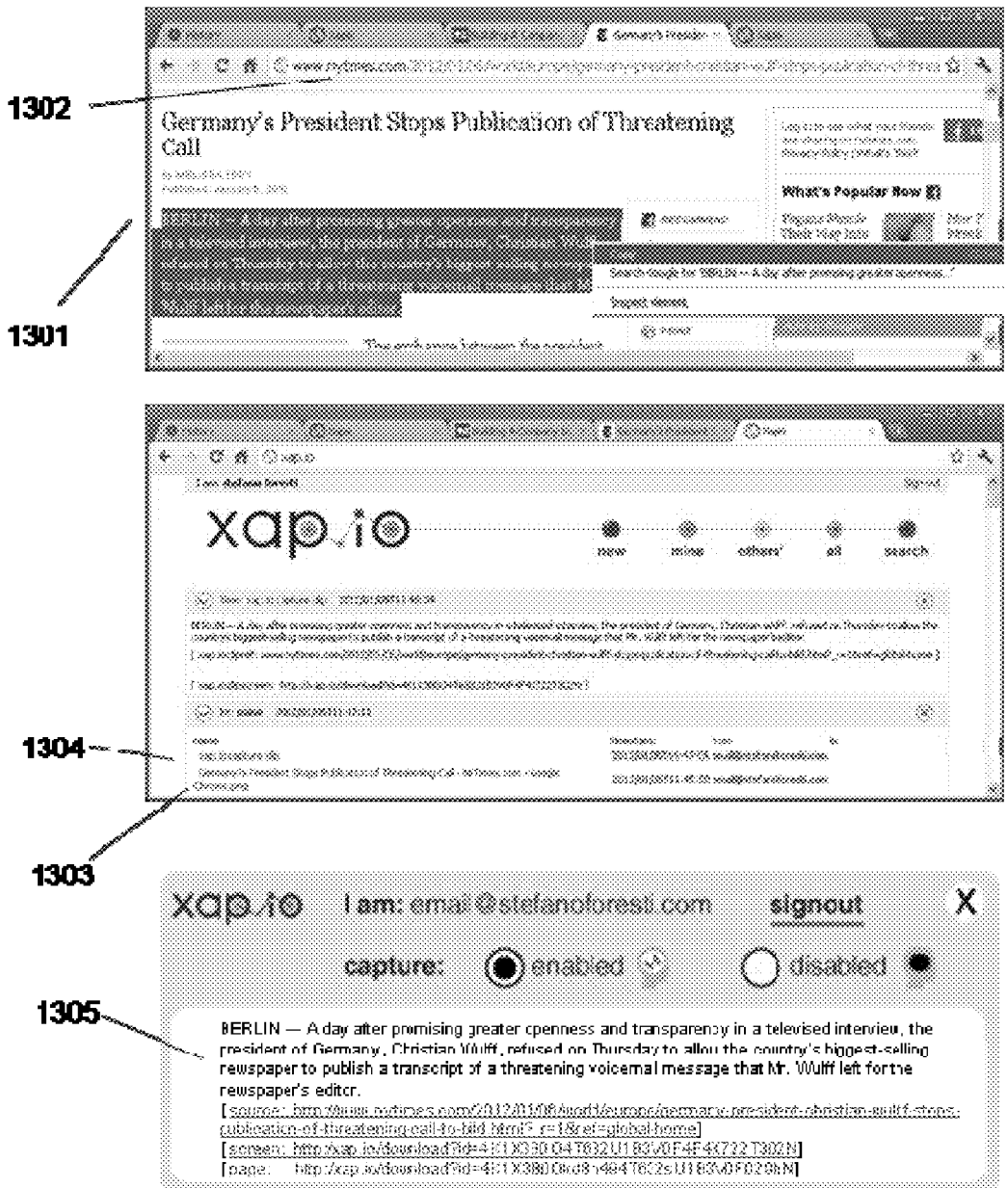
FIG. 13 illustrates the details of passive connection in the browser.

FIG. 13 describes an example.

User reads at www.nytimes.com/2012/01/06/world/europe/germany-president-christian-wulff-stops-publicationof-threatening-call-to-bild.html?_r=1&ref=global-home and copies a paragraph, shown by the selected content in FIG. 1301.

On the user's account on xap.io, this is the result (regardless of pasting). In "mine" there is a new idea (named: xap.io capture clip) 1304).

If I view the clip it references the NYtimes.com web link, the screengrab link on xap.io, and the saved page link on xap.io. The Xap.io GUI shows this 1305, which is equal to viewing the clip in the browser:

If the user pastes before copying something else, the result (in the apps that we said above) is:

HTML:
- BERLIN—A day after promising greater openness and transparency in a televised interview, the president of Germany, Christian Wulff, refused on Thursday to allow the country's biggest-selling newspaper to publish a transcript of a threatening voicemail message that Mr. Wulff left for the newspaper's editor. [xap.io/show-?capt-id]

Text:
- BERLIN—A day after promising greater openness and transparency in a televised interview, the president of Germany, Christian Wulff, refused on Thursday to allow the country's biggest-selling newspaper to publish a transcript of a threatening voicemail message that Mr. Wulff left for the newspaper's editor. [http://xap.io/show?capt-id]

The HTML file that was uploaded [http://xap.io/show-?capt-id] is the modified clipboard and has this content:

Modified Clipboard in HTML: 1305
- BERLIN—A day after promising greater openness and transparency in a televised interview, the president of Germany, Christian Wulff, refused on Thursday to allow the country's biggest-selling newspaper to publish a transcript of a threatening voicemail message that Mr. Wulff left for the newspaper's editor.

[source: http://www.nytimes.com/2012/01/06/world/europe/germany-president-christian-wulff-stops-publication-of-threatening-call-to-bild.html?_r=1&ref=global-home]
[screen: http://xap.io/download?id=4K1X3B0O4T632U1B3V0F4F4X722T302N]
[page: http://xap.io/download?id=4K1X3B0Okd8h494T632sU1B3V0F029hN]

Copy a Selection of Content in any Application Software on the Device.

When USER selects text or a whole section of objects displayed in an application software (e.g. in MS Word, as used in the following description, but it can be extended to other applications such as Adobe Acrobat, etc.), the following happens, as described in FIG. 14.

USER selects text in Word: <copied text> 1401
USER copies (via click, copy, CTRL-C etc.)
XAUT obtains from XSRV (or generates locally in XAUT) a xap.io URL "xap.io/show?capt-id" for the HTML of this capture with references
XAUT modifies the clipboard for pasting elsewhere as follows:

| Text editors: | <copied text> [http://xap.io/show?capt-id] |
| RFT/HTML editors: | <copied text> [xap.io/show?capt-id] |

At this point the clipboard is ready even if the files are not uploaded yet

XAUT determines the file path locally filepath (e.g. C:/User/file.doc)
XAUT shoots a screengrab of the Word window
XAUT obtains from server (or generates locally) a xap.io URL filepath (xap.io/show?file-id) for the file 1402
XAUT uploads on xap.io the file.doc (along with the file-id if generated locally)
XSRV receives file.doc (and file-id if generated locally) and associate them
XAUT obtains from server (or generates locally) a xap.io URL scrnpath (xap.io/show?scrn-id) for the screengrab 1403
XAUT uploads on xap.io the browser's file.png (along with the scrn-id if generated locally)
XSRV receives file.png (and scrn-id if generated locally) and associate them
XAUT saves a HTML file of the content in the browser that corresponds to the current URL
XAUT creates an HTML file "xap.io capture clip" or "the first N characters of text of the copied content" which is the capture with sources as follows: 1404
<copied text>[source: origpath][screen: scrnpath]
XAUT uploads on XSRV the file capture.html (and capt-id if generated locally)
XSRV receives xap.io capture clip (and capt-id if generated locally) and associate them
XSRV displays xap.io capture clip in the frame triggered by "capture button"

In case the user does a Paste following the copy this is what happens to the clipboard to be pasted:

| Text editors: | <copied text> [http://xap.io/show?capt-id] |
| RFT/HTML editors: | <copied text> [xap.io/show?capt-id] 1405 |

Figure 14:
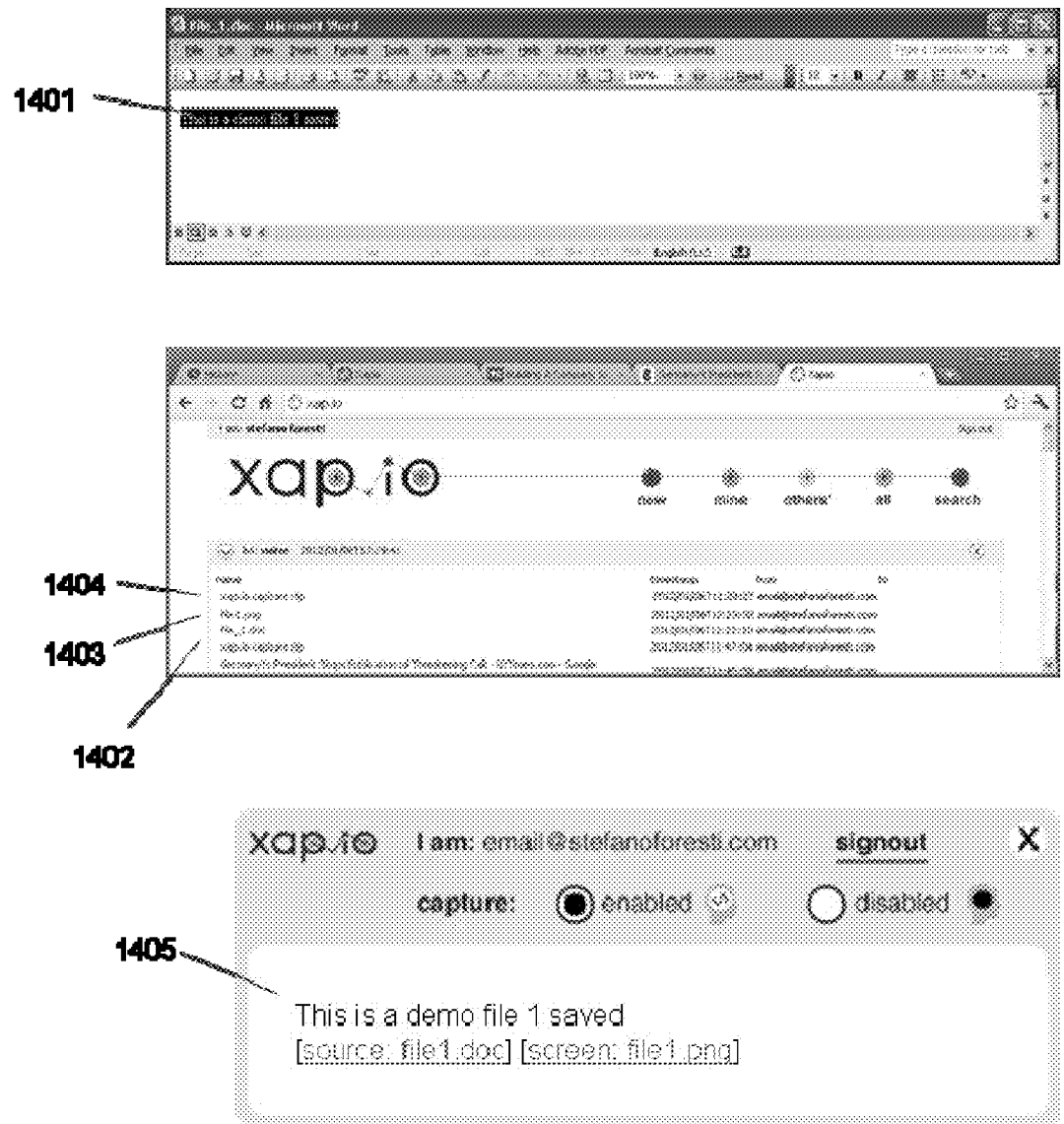
FIG. 14 illustrates the details of passive connection in an application (e.g. Word).

FIG. 14 describes an example.

1. User opens file1.doc and copies the selected text 1401.
2. On the user's account on xap.io shows the result in "Mine", regardless of pasting: a new idea, named: xap.io capture clip 1404, which is the text copied with references to, the uploaded screengrab 1403, and the uploaded file 1402.
3. If I view the clip, it shows the text and the two links, same as the GUI.
4. If the user pastes before copying something else, then the result is:

RTF/HTML Editors: 1405

This is a demo file 1 saved

[source: file1.doc] [screen: file1.png]

Text Editors:

This is a demo file 1 saved

[source: file.doc http://xap.io/show?id=4K1X3Oxfg39458B3V0F4F4X722Teg9=30s]
[source: file_1.png http://xap.io/download?id=3B0O4T632U1B3V0F4F4X722T3t9c]

One Click Capture.

One click capture creates an immutable webification of a selected display in a personal device (e.g. a personal computer, or smart phone, or a virtual environment), with a simple action such as, one click if a mouse, a button of the hardware, a tap of the screen or any other basic interaction with an input device.

One Click in Browser.

In this section the one click capture is in any browser.

USER has the browser in the foreground, but does not select content, and wants to save URL and screengrab.

USER clicks a mouse button, (or the screen, or a hardware button) anywhere within the browser window.

XAUT determines the originating URL in the browser, say variable origpath (e.g. www.nytimes.com/ . . . )

XAUT shoots a screengrab of the browser window.

XAUT obtains from server (or generates locally) a xap.io URL scrnpath (xap.io/show?scrn-id) for the screengrab.

XAUT uploads on xap.io the browser's "title of web page".png (along with the scrn-id if generated locally).

XSRV receives screengrab.png (and scrn-id if generated locally) and associate them.

XAUT obtains from server (or generates locally) a xap.io URL "xap.io/show?capt-id" for the HTML of this capture with references.

XAUT creates an HTML file "capture.html" or if easy "title of web page".html which is the capture with sources as follows: <copied text>[source: origpath][screen: scrnpath].

XAUT displays in the Xap.io GUI the file capture.html.

XAUT uploads on xap.io server the file capture.html (and capt-id if generated locally).

XSRV receives capture.html (and capt-id if generated locally) and associate them.

XSRV displays capture.html in the frame triggered by "capture button".

One Click in an App.

In this section the one click capture is described.

USER has a window in the foreground running an app, but does not select content, and wants to save a screengrab or the file or both.

USER clicks the mouse button, (or the screen, or the hardware) anywhere within the window.

XAUT determines the file path locally filepath (e.g. C:/User/file.doc).

XAUT shoots a screengrab of the app window.

XAUT obtains from server (or generates locally) a xap.io URL filepath (xap.io/show?file-id) for the file.

XAUT uploads on xap.io the file (along with the file-id if generated locally).

XAUT obtains from server (or generates locally) a xap.io URL scrnpath (xap.io/show?scrn-id) for the screengrab.

XAUT uploads on xap.io the browser's "file.png" (along with the scrn-id if generated locally).

XSRV receives file.doc (and file-id if generated locally) and associate them.

XSRV receives file.png (and scrn-id if generated locally) and associate them.

XAUT obtains from server (or generates locally) a xap.io URL "xap.io/show?capt-id" for the HTML of this capture with reference.

XAUT creates an HTML file "capture.html" or "window_title.html" which is the capture with sources as follows: <copied text>[source: origpath][screen: scrnpath]

XAUT uploads on xap.io server the file capture.html (and capt-id if generated locally).

XSRV receives capture.html (and capt-id if generated locally) and associate them.

XSRV displays capture.html in the "capture frame".

One Click in the Whole Display.

In this section the one click capture of the whole display is described.

USER wants to get a screengrab of the whole display.

USER clicks the mouse button, (or the screen, or the hardware) anywhere in the desktop background (so not inside an open window).

XAUT shoots a screengrab of the desktop.

XAUT obtains from server (or generates locally) a xap.io URL scrnpath (xap.io/show?scrn-id) for the screengrab.

XAUT uploads on xap.io the browser's screengrab.png (along with the scrn-id if generated locally).

XSRV receives screengrab.png (and scrn-id if generated locally) and associate them.

XAUT creates an HTML file "capture.html" which is the capture with sources as follows: [screen: scrnpath]

XAUT displays in the Xap.io GUI the file capture.html

Meta-Editing.

Figure 29:
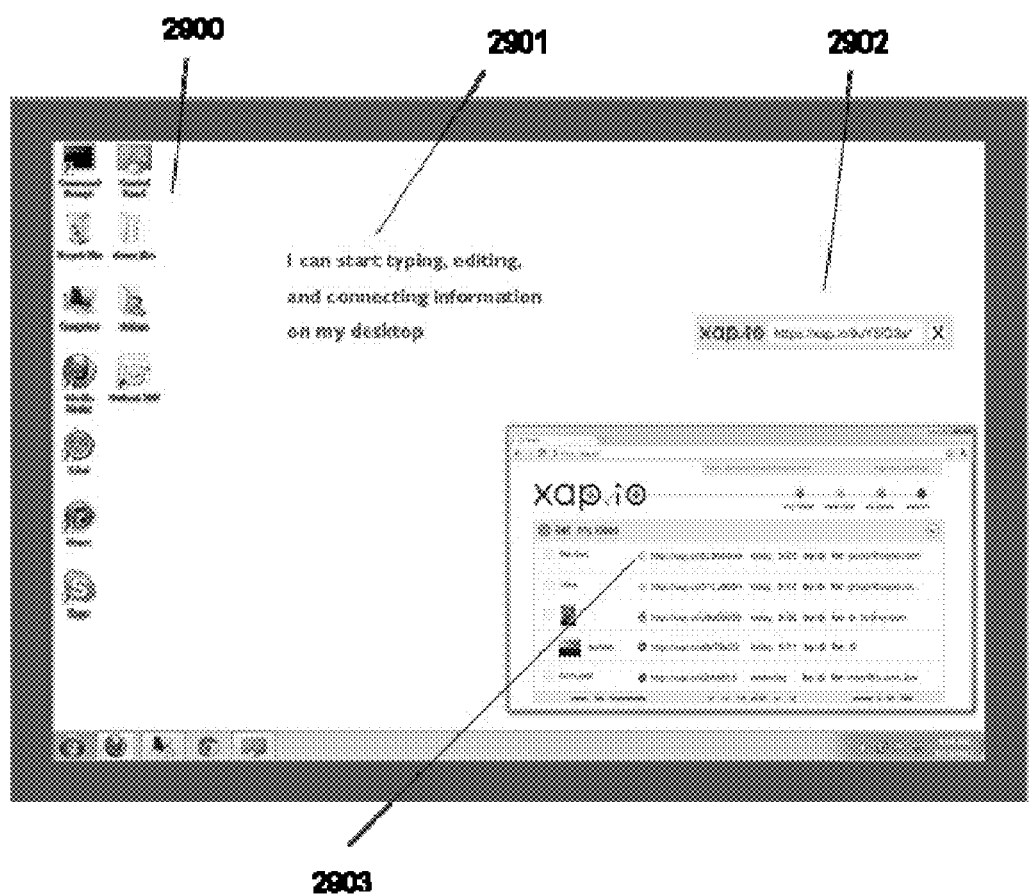
FIG. 29 illustrates the meta-editing right on the desktop.

In this section the meta-editing is described, as shown in FIG. 29. With xap.io and the Xdaemon installed on the device, a user does not have to choose an application that has an editor to start typing, and editing anything they want, such as a note, or capturing, connecting, and annotating any content they see in any application. A user starts typing in a desktop 2900 and the text is immediately displayed 2901. The user can click on the xap.io GUI to save 2902, and the idea is immediately webified and available in xap.io "mine" 2903. Another embodiment of meta-editing is on a smart phone display, or any other types of displays.

The Web User Interface to the System

The First Time a User Uses the System.

Figure 15:
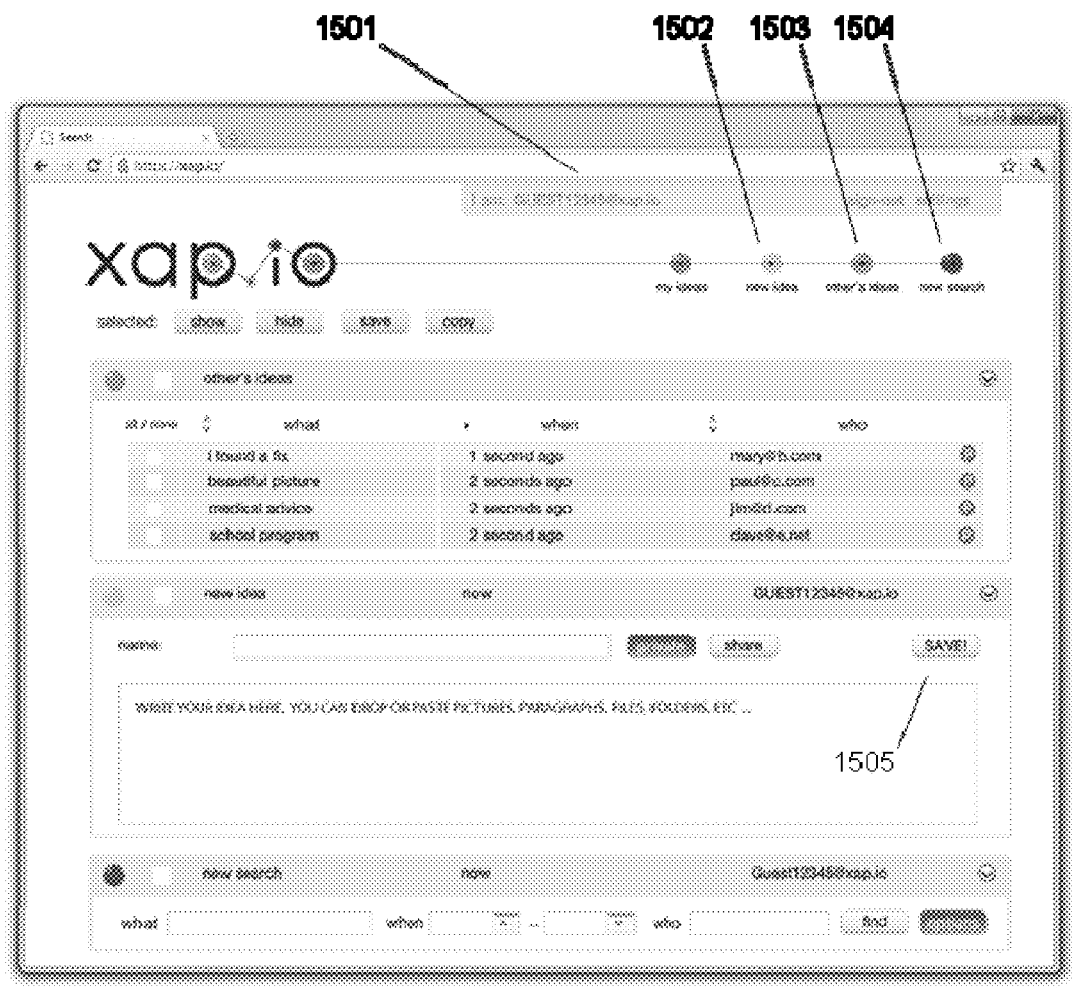
FIG. 15 illustrates the web user interface of the system.

When a new user clicks xap.io she sees content and the ability to do something regardless if she has an account or not, and regardless if she says who she is. This is shown in FIG. 15. If she had not previously authenticated in the browser session (or if she never had an account), then she gets assigned a Guest#@xap.io ID 1501. She will be able to say at any time who she is, but that is not necessary. This makes the system as frictionless to experiment as possible.

Others': these are the most recent public ideas of others. 1503

New idea: the user can immediately edit a new idea (see idea creation). 1502 If the user is an unidentified (Guest#) then at the time of clicking "SAVE" a message is displayed saying: "If you want to find again this idea, you may identify yourself, or you need to remember and reuse this Guest#ID and this temporary password.

New search: 1504 the user can immediately search (in the information space available to the user ID, identified or guest). The user can search by who, what, when.

Edit. The xap.io system has a way to edit ideas, in addition to using the applications as usual. An idea can be created from scratch, or by editing a previous idea. The basics of idea creation:

Idea Name:

for new idea, the name is blank if idea is an edit of an existing idea, the name starts as the same as the idea that was edited (and it can be changed (though it may affect finding versions)

if name is blank at the time of saving, the name remains blank (the idea can be found by time, creator, and content)

Figure 17:
FIG. 17 illustrates editing an existing idea in the web interface of the system.
Figure 18:
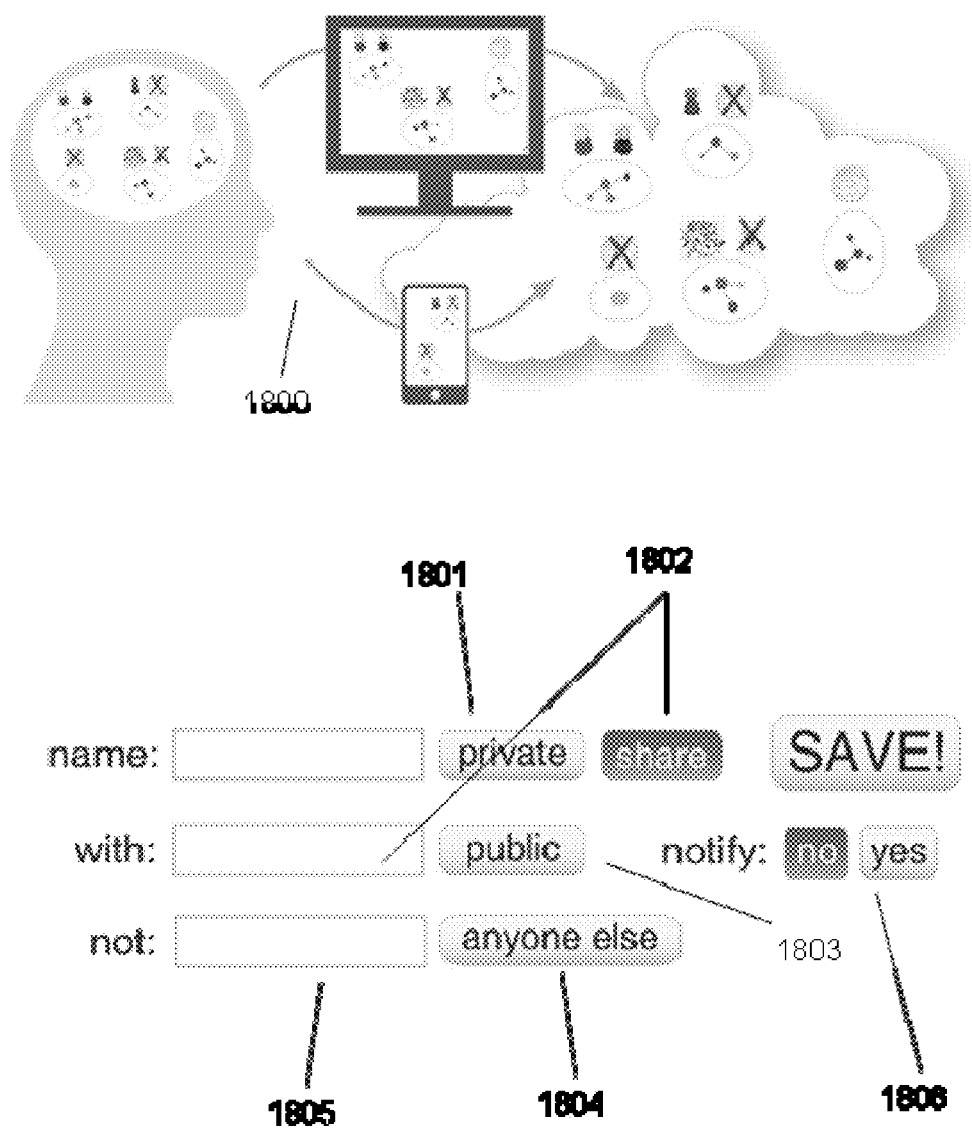
FIG. 18 illustrates the permission model and user interface.
Figure 19:
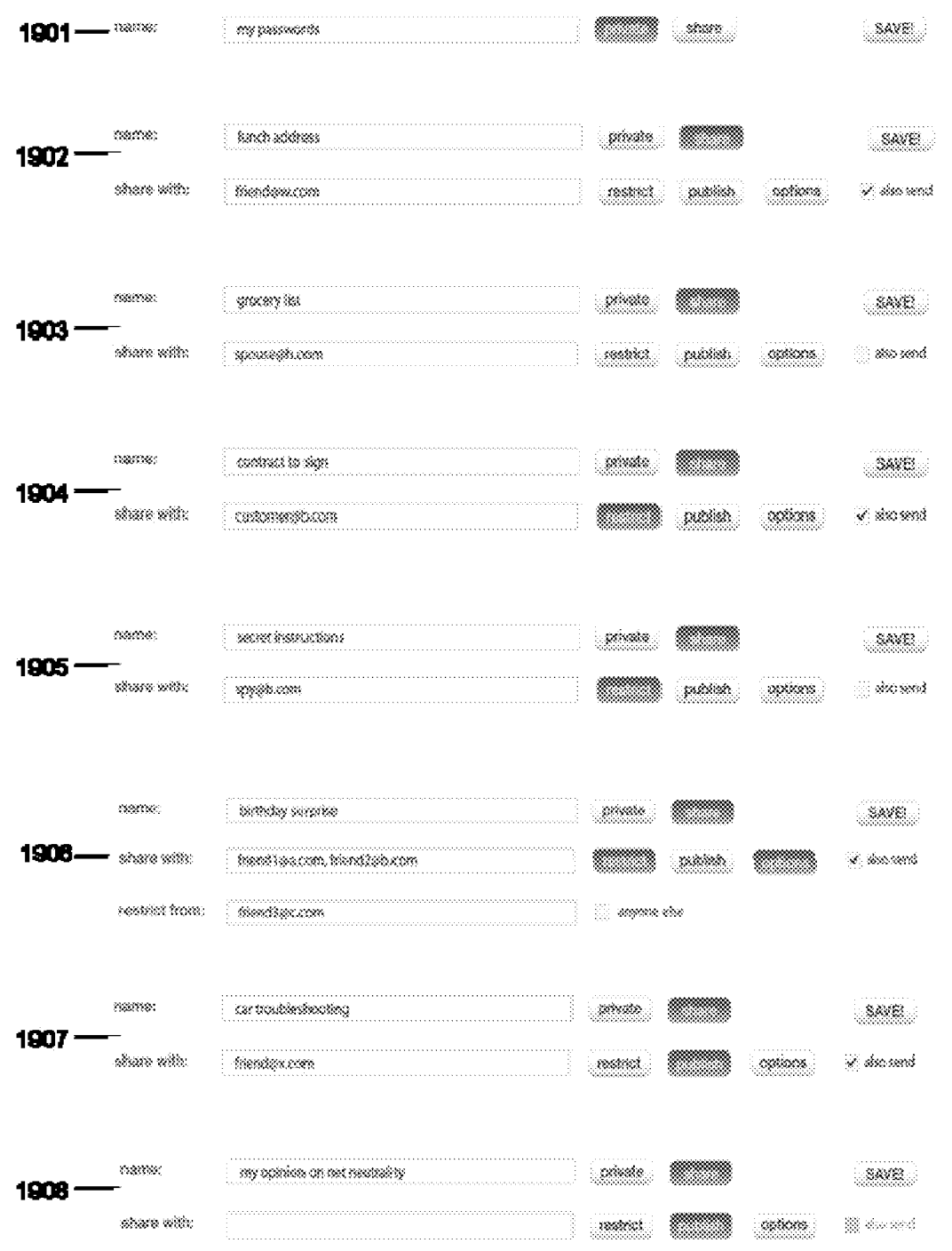

Time:
  the UTC time stamp is used in the database to support and be consistent with the global notary system.
  the date can be displayed based on specific time zone, if the user has selected it in user options (User Options—to be described in detail)
  a pretty date (yesterday, 1 hour ago, Monday, etc.) can be also displayed instead of UTC and based on user preferences. However, the UTC time stamp shall always be available with mouse over.
Creator:
  the identity of the person (Pid) that is currently used in the xap.io browser session (authenticated, or GuestID), or
  if anonymous/unauthenticated, xap.io facilitates that the person identifies, like saying: tell us who you are, or if you want to come back and find this idea, then you are guest349587347 and remember this temporary password: PWD012345
  Share: the default is private, all options and process for sharing is explained in the SHARE section.
  Save: actions explained later.
  Editing an idea. A user can write text, and at any time drag & drop or copy & paste in the idea: files, web pages, results from searches, images, folders, paragraphs from any other chunk of information that she selects in her environment. When she drops an object in your idea, the idea transparently and immediately hyperlinks to that object (i.e. not embedding or attaching the object, though you may see its thumbnail). Such selected objects are "webified" (xap.io assigns a global address/URI) so they become web accessible. Also, her new idea will have the immediate reference (hyperlink) to those dragged and dropped objects. So for instance, if she drag&drop a paragraph from a file, the file becomes a web object, the paragraph is copied into her idea, maintaining the link to the original object. If an object was already a web object, it was already web accessible, so xap.io can use that URL. The process is the same as described for across applications on the device.
  Save. When saved is clicked, the idea is time stamped and immutable FIG. 16. The idea is saved and webified: a global address is assigned and the idea is stored. All linked ideas/files are also webified at save time. The result is that the saved idea is now an object addressed on the web, and all objects hyperlinked in the saved idea are also objects addressed on the web. The display changes from editable to view (of the same idea). If a user wants to edit and change the idea, user will have to edit the saved idea, but because ideas are immutable, then a new idea will be generated (starting from the original one).
  Editing an existing idea. When idea is created by clicking "edit" in an existing idea 1601, the editable area 1701 in FIG. 17 contains the original idea, and a link to the original idea is added at the end of this new idea.
Share Permission Model: Who can Find What
  The permission model (conceptually shown in FIG. 18 1800) is a variation of the message model (email, SMS, etc.) which has proven so practical for people to share specific info with specific people anywhere in the world). The model in this invention fixes the shortcomings of messages: first, the pull option, since much information could be shared and findable without overloading others' inboxes; second, the public option (like web pages and blogs); and third, the confidentiality option, that requires positive identification to pull, thus limiting the forward to unintended people.
  For each "what" the author decides: who can find it (pulled), whom to send it to (also pushed), who must not find it (confidential). When the author saves, this system generates an Xid for that object so that the metabase knows who will be able to find or view such object, either searching, or clicking on a hyperlink in view. Notice that the permission is not in the way of the transparent capture: the default is "private" (only author can find), and if the author wants to give permission to others, then they choose to do so by using the sharing UI.
  For each "what" I decide:
  who can find it (pulled)
  whom to send it to (also pushed)
  who must not find (confidential)
  When the author saves, Xap.io generates an Xid for that object so that the metabase knows who will be able to find or view such object, either searching, or clicking on a hyperlink in view.
  The model supports the typical decision making process for sharing a specific information object:
  is this private (i.e. I do not want anyone else to see this)?
  who do I want to see this?
  do I mind if others find this?
  who must no see this?
  The relationship between one information object and one person in the mind of the creator is:
  I want this person to see this idea
  I don't care if this person finds this idea
  I don't want this person to find this idea
  When creating information, the creator makes a judgment about this idea (or ideas) and the rest of the world. In practice, the decision about this object is:
  whom I want (to find it)
  whom don't I want (to find it)
  whom I don't mind (to find it)
  As a result, a safe and usable approach for the decision making process about sharing when creating an idea is like this, as in FIG. 18:
  is this private (just for me) or shareable? 1801
  Which people do you what to share with? 1802
  Or do you want to publish to the world? 1803
  Do you want to prevent the rest of the world to find this? 1804
  Or do you want some specific people to not find this? 1805
  If you had specific people in mind, do you want to send to them too? 1806
  The sharing model supports the typical user intentions, and is described in FIG. 19. For each idea, I decide who can find it and who must not. Examples:
  this is just for me, and no one else in the world (personal, private, only pull);
  I want Mary and John to see this, and others may find it (push+public pull);
  I want the world to find it! (public pull)
  I want Joe to see this: just him but no one else can find it (confidential push);
  I want "Group" to find this, except Joe (confidential pull).
Share User Interface Description
  Private. This is the default share option: private, that means that only author can find and access, described. 1901
  Name: is the name of the idea
  The button "private" is turned on by default.
  when the button SAVE! is clicked, the idea is saved (private)
  if the button "share" is clicked, it becomes turned on and the "private" is turned off, and vice versa.
  Shared. When the share button is clicked: it opens a new line with the basic options.
  Share with: is the list of people (however defined) to share with.

Restrict, publish, and options are turned off (see the other cases when they are turned on). Restrict and publish are the opposite of each other, so turning one on turns off the other. However, one can also turn themselves off (i.e. to go back to default share=no restrict no publish). Options will turn on a row with explanation, and if either restrict or publish are turned on, then it will put a row of the relative options (see later).

"Also send" check box indicates whether the idea gets sent as a message, or not, in which case is just findable via a search or browse.

In case the "private" is clicked after the share info is populated, the share option row disappears, but the info is kept in cache in case the user changes mind again and so the info would be there.

The scenario option 1902 is equivalent to email messages:
  Idea is sent to recipient list, and is findable by the "share with list" in a search.
  Idea is not findable by others on a search, but the sender does not care in case it gets reshared.
  Idea can be reshared, and won't require identification.

The scenario option 1903 is a message for someone specific on a bulletin board:
  Idea is not sent to recipient list, but just findable by the "share with list" in a search
  Idea is not findable by others on a search, but the sender does not care in case it gets reshared
  Idea can be reshared, won't require identification Restricted. This is the share option when the restrict button is clicked.
  Share with: is the list of people (however defined) to share with
  Restrict turned on means that no one else can access that This scenario option 1904 is equivalent to secure email:
  Idea is sent to recipient list, and is findable only by the "share with list" in a search
  Idea is not findable by others on a search
  Idea requires identification This scenario option 1905 is equivalent to a secure post:
  Idea is not sent to recipient list, and is findable only by the "share with list" in a search
  Idea is not findable by others on a search
  Idea requires identification When the options button is clicked with restrict on, a new form appears allowing to select specific people that must not find, as shown in 1906. This is what happens if I put specific people in the restrict list. I indicate to the recipients exactly who I don't want to know the idea. If this is in groups, it may not matter if others outside know, as they won't care and there won't be value.

Public. This is the share option when the publish button is clicked.
  Share with: is the list of people (however defined) to share with
  Publish turned on means that everyone can access that This scenario option 1907 is equivalent to a message sent to someone and also to a blog:
  Idea is sent to recipient list, but is also findable by anyone that searches
  Idea is findable by others on a search
  Idea does not require identification This scenario option 1908 is equivalent to a blog:
  Idea is not sent to anyone, but is also findable by anyone that searches for me
  Idea is findable by others on a search
  Idea does not require identification How to select people. People can be selected with any form of identification that such person will be able to prove ownership of: email address, phone number, mail address, government issued ID, or any internet service username or other identification method.

Share under the hood. Under the hood, what happens is that for each object that is related to the idea a record in the XMetabase table of access controls is created. The permission intention related to the idea is translated into a row of the table. For each person the default is "don't care", unless the intention of that person was expressed otherwise in the xap.io UI. So the options are:
  yes (this means that this person will find this object in a search)
  don't care (this means that this person does not have to be positively authenticated to access this, but it won't show up in searches)
  no: (this means that this person must be positively authenticated to access this)

In addition, if the checkbox had "also send" on, that means that at the time of saving the idea, is also sent as a message to the list of "share with".

Figure 20:
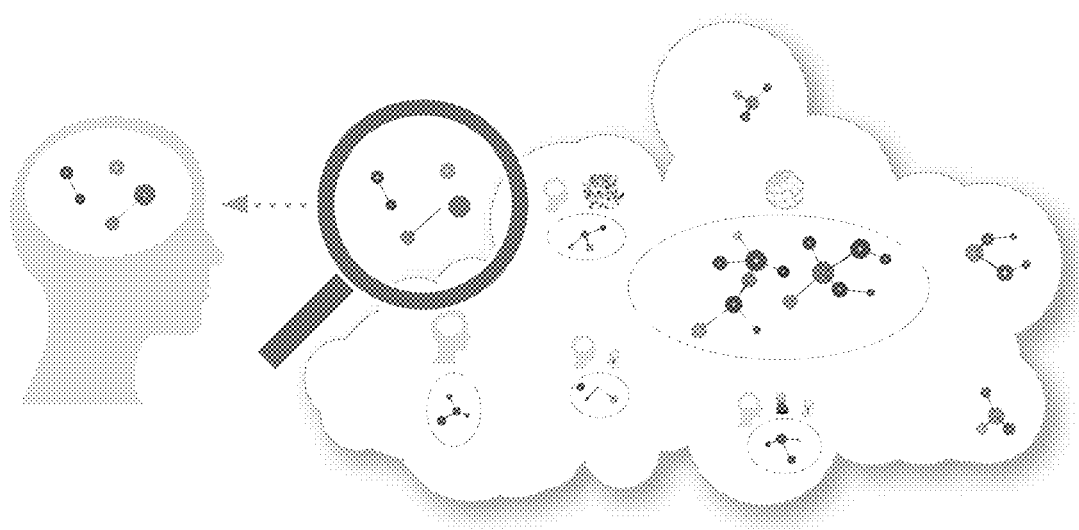
FIG. 20 illustrates the conceptual model to finding information.

Find: Search or Navigate Through any Info I have Access to
  Given the powerful, flexible and intuitive way to manage and share info, now I can find more and easier what I need, as shown conceptually in FIG. 20.
  I can search not just public info, but any info that anyone in the world shared with me
  I search and navigate info across apps, devices, accounts
  I can find connected info, and navigate through the connections (hyperlinks)
  when I look for something I had seen previously, I can see it now exactly as it was; I can decide also to see if and how it has changed (e.g. I have the option to see how it was then or how it is now).

Scenarios. The goal of the system is to significantly improve finding and understanding information in context. Here are three scenarios where xap.io provides a solution:
  1. find sources,
  2. find by who or when across silos,
  3. search without target keywords.

In these scenarios, information is very hard to impossible to find with current technology. Better search algorithms may not help; also, requiring users to work more or differently to organize information today for the promise to find something tomorrow is a hard sell. The following scenarios are examples of the search interface and how users find information that would be otherwise disaggregated, disconnected, thus hard to find.

Figure 21:
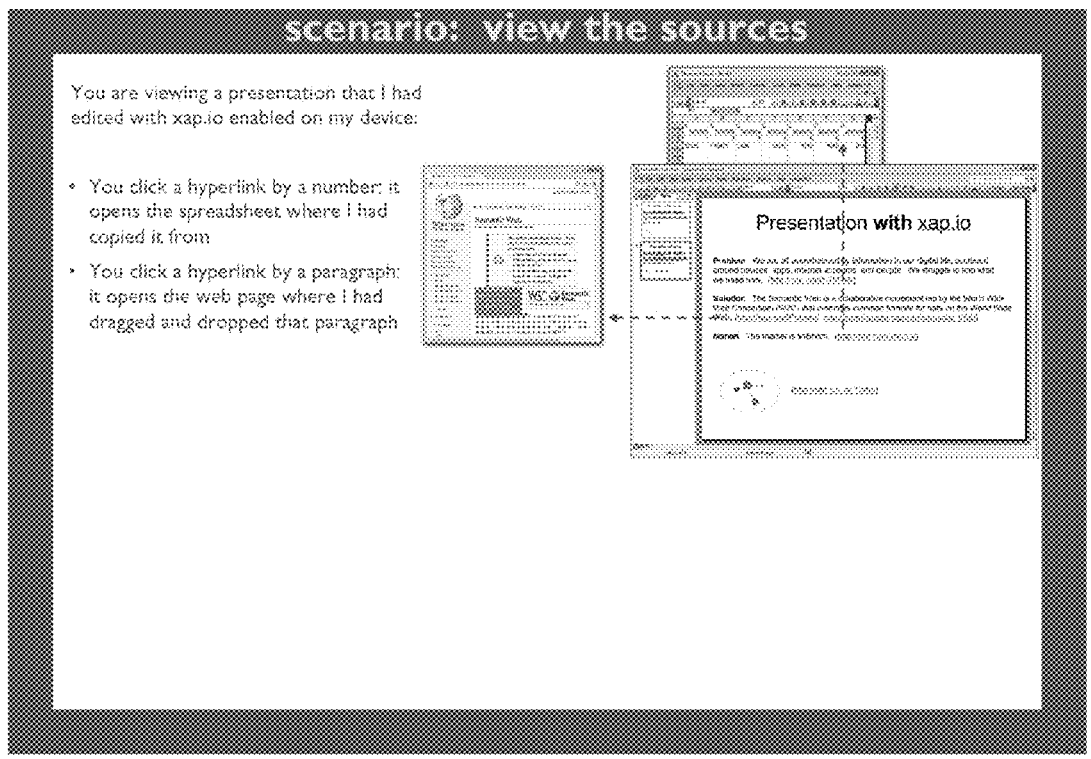
FIG. 21 illustrates finding the sources of information as a follow up to the scenario shown in FIG. 7.

Find Sources (Provenance):
  the sources of information are important to understand the context, prove the validity of information, and provide audit trails. FIG. 21 shows the follow up scenario to the one shown in FIG. 7. If "you" view the presentation that was prepared by "me" with xap.io enabled in my desktop, you will be able to click through the hyperlinks and see the sources of information used. This scenario has been identified as an open problem in various professions, and specifically in the research labs, in collaborative research, and production of documents Search without a Target Keyword:
  Sometimes we are looking for some information we remember editing or seeing in the past; however, we don't remember any exact text in the data or metadata. The way humans often remember information is by recalling information relationships in their mind. The xap.io system helps finding information similarly to how we do it in our mind, because information that was related in our mind got linked at the time of production. Now, we can navigate through the relationships starting with the information we remember, in order to get to the target.

Figure 22:
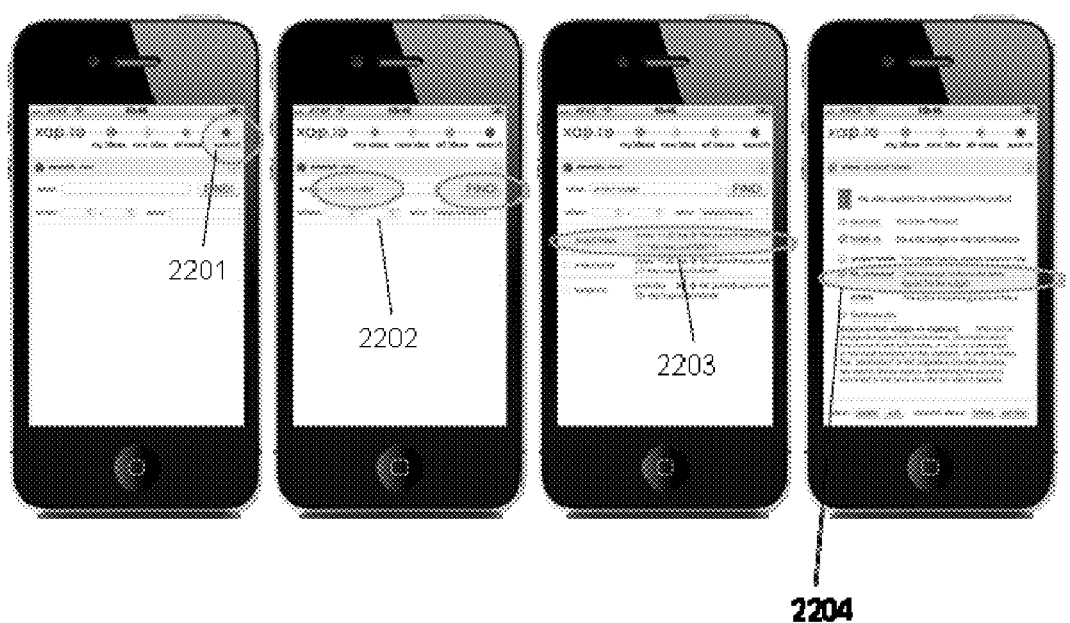
FIG. 22 illustrates finding information without a target keyword.

FIG. 22 shows this: I remember getting new budget figures for my project from someone, but . . . where are they?
1. I start a xap.io search, which has what-when-who search options 2201
2. let's try "project budget" in my stuff, and see what I get . . . 2202
3. it's not budget.xls, which is the old budget, but let's see in project notes . . . 2203
4. Oh, here is the message I got about the proposal: I remember the figures were in there! 2204
5. now I can open that message, get the figures I needed, and update my budget!

Following Linked and Similar Objects.

Figure 23:
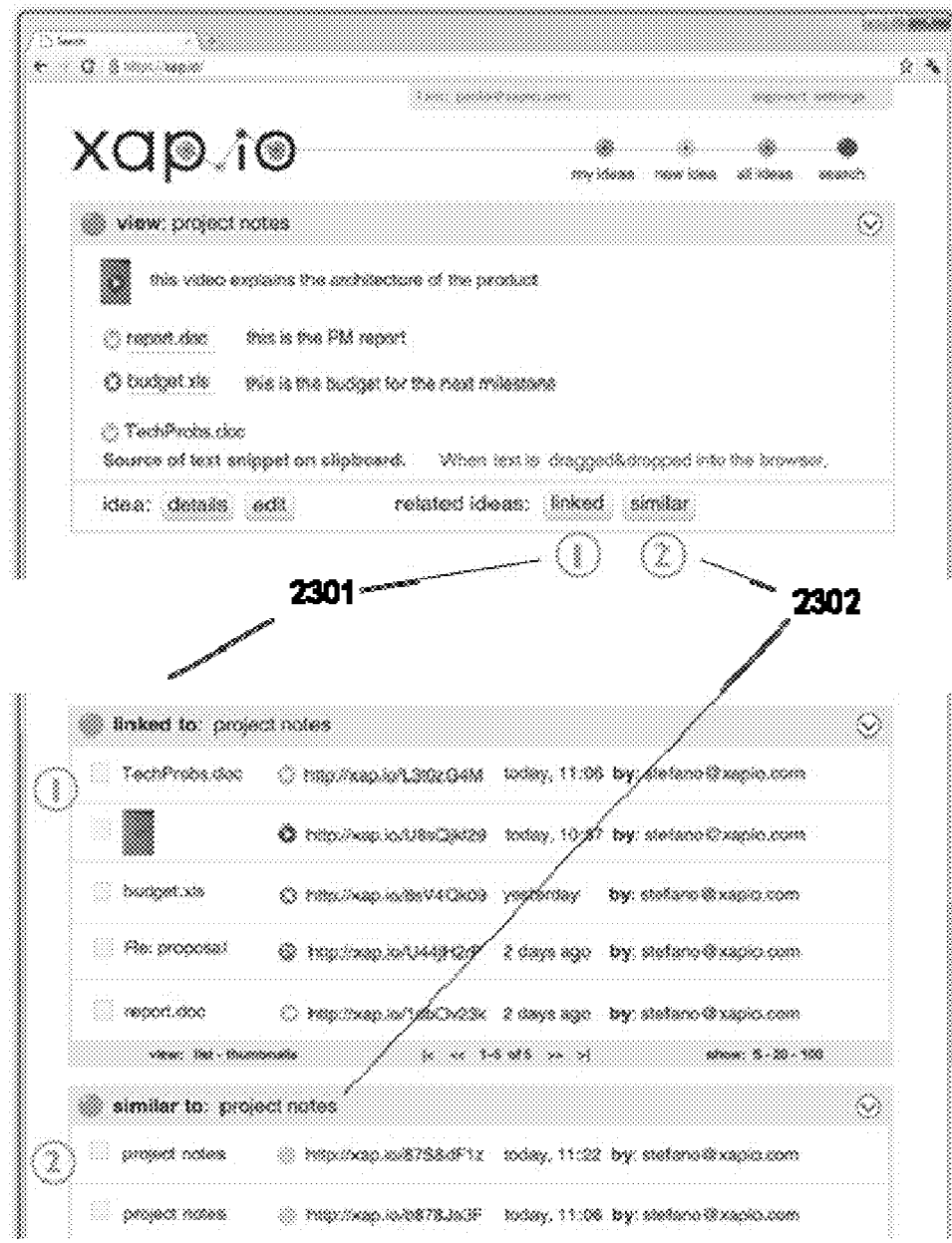
FIG. 23 illustrates finding connected objects to the objects in view, that are linked or similar objects.

FIG. 23 is a typical scenario in various information centric professions: collaborative document production. My colleague opens the project notes I sent him some time ago. He wants to pick up the project, and figure out what he needs to do.

What's new?
Where does it come from?
He is viewing the latest version he got, and can click (1) "linked" 2301 and (2) "similar" 2302. Both buttons are xap.io searches that return objects accessible by him:
1. "linked" returns the list of objects connected to the "project notes", providing an understanding of the various pieces related to the project. 2301
2. "similar: returns the versions of "project notes": he sees that there is a newer version than he was viewing. 2302

Now he has a recollection of the project, sees what's new, and can navigate through the connections and explanations around the various pieces of information on the project. He can now understand what was done, and pick up the project to do his part with the apps of his choice.

Gathering Stuff Across Devices and Apps.

Figure 24:
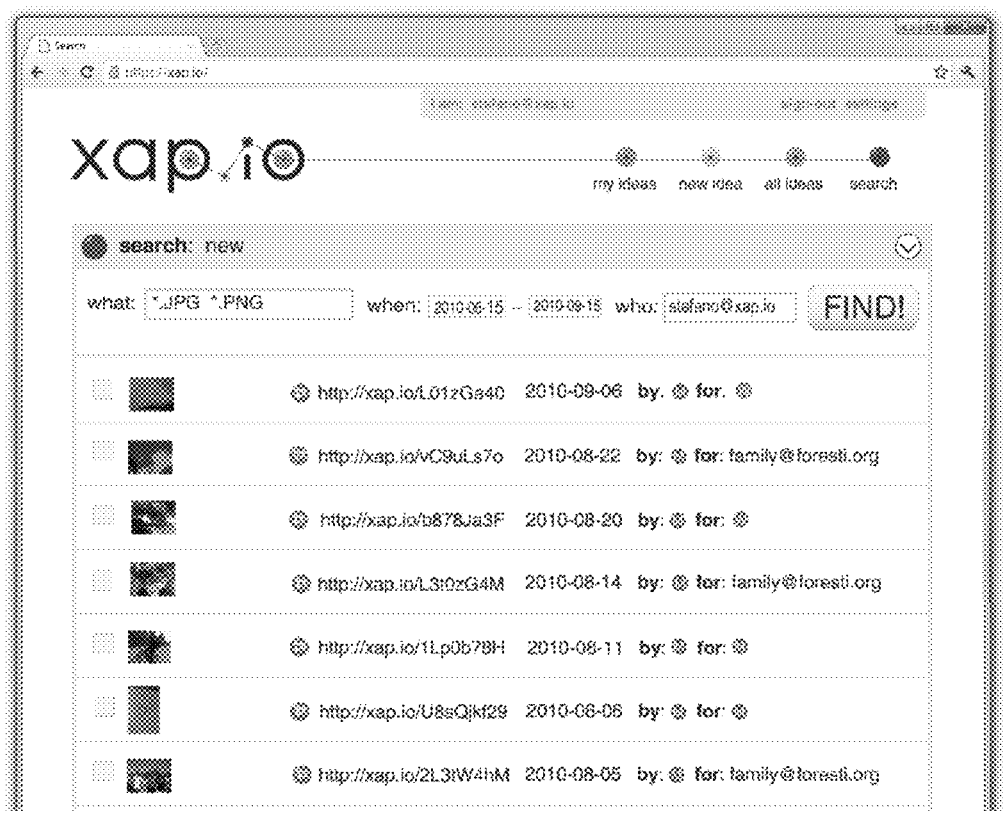
FIG. 24 illustrates finding information by who what or when that would otherwise be scattered around containers: devices, accounts, folders, people, etc.

FIG. 24 shows a scenario that can apply to professional and personal activities. As information gets all "webified" the chances to find information in the network via searches or through links significantly increases.

For instance, I want to see all pictures and videos of last summer trip:
the ones I took with my phone
the ones I took with my video camera
the ones my wife put in a folder in her computer
the ones sent to us by our friends.
I ask xap.io to find:
all the jpg, mpg, etc.
between July 15 and 31
by or shared with me
Here is the list: no less, no more!

Find Interface Description

The system at xap.io performs searches in the metabase of the xap.io information network, returning results that are authored by or shared with the person identified as the searcher: this includes personal, shared and public info. The Xap.io's architecture is designed to webify information in personal devices: files may stay in the originating device or uploaded in the cloud (based on the user preference and storage quotas). This model makes it transparent to:
get info instantly webified and searchable, even huge files such as videos that may be stuck in a device due to bandwidth constraints, and
phase out a web with permanently broken links.
When links get clicked by an authorized user, the file may be requested from the originating device.

Finding all I have Access to.

As a user, I can search or navigate through all Xids that are permitted to me. If I can prove that I am the owner of various identities (emails, OpenID, etc.) my permitted information space includes all those objects whose permission list includes one of such IDs. The recurring theme is that user is presented results of searches, or can navigate through ideas that have been permitted to user. If the user performs a keyword search, only the results that have been flagged positively in the permission metabase (creator indicated permission to user, or published) are returned among the list of results. Therefore, this does not include the ideas where user was not specifically listed, and the object was not public (i.e. the "I don't care" don't meet search results).

If the user stumbles upon an idea where user was part of "I don't care", the idea is accessible. This includes forward in a message, or viewing the link of the idea as part of another idea.

How List of Results are Displayed.

Figure 25:
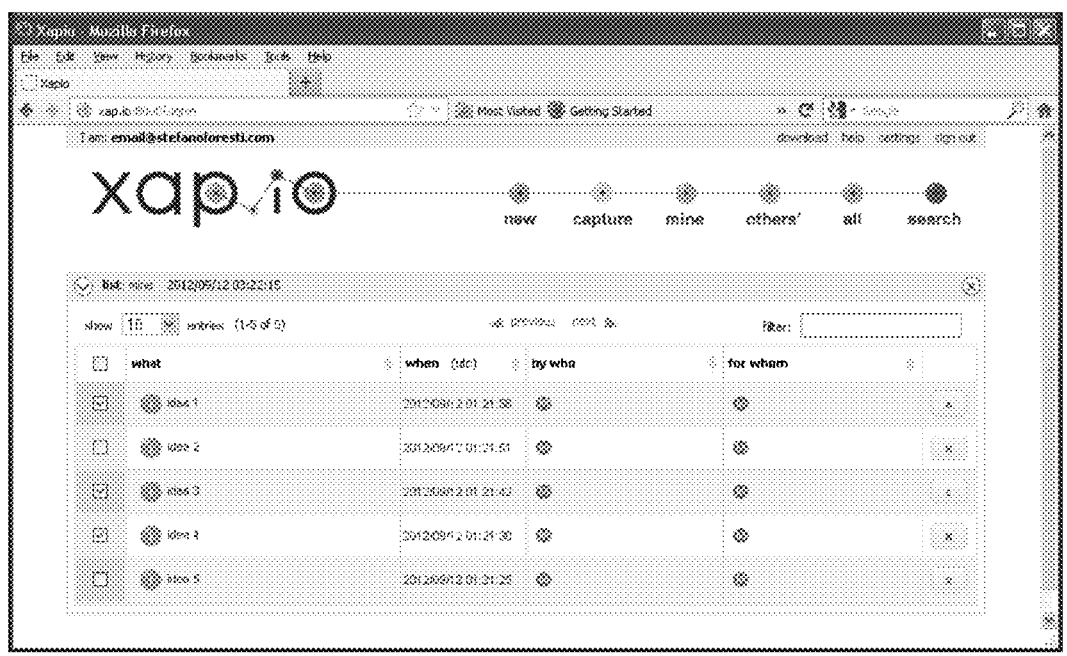
FIG. 25 illustrates an embodiment for the user interface to display search results.

The results of a search can be displayed in reverse chronological order, with what-when-who metadata. FIG. 25 shows how the results may be displayed:
list: search indicates the search effected
time: UTC of when the search was effected
all/none: will select or unselect respectively all boxes in view.
what-when-who arrows: allow to show and change the order of the result list
select box: allows to select, and (using the xap.io controls to show-hide, and link selected items
what: name of idea
when: UTC of idea creation
by who: author of idea
for whom: who is permitted to find (the P icon means that the idea is public, and M is mine or private)

Search by Keyword.

Figure 26:
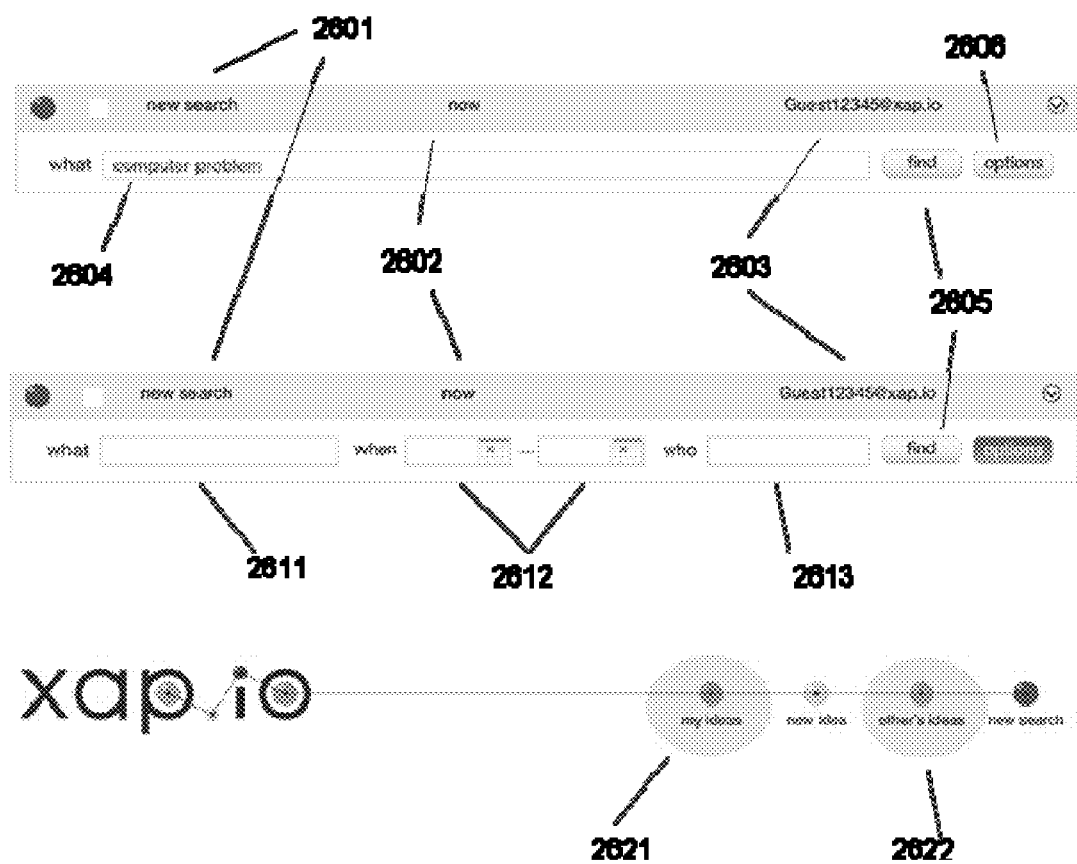
FIG. 26 illustrates embodiment for search.

When a "new search" is requested by user (like in the xap.io main toolbar), a new frame is opened containing the elements for a basic search by keyword. FIG. 26 describes an embodiment for searching:
new search 2601
time show now, and will set the UTC time only upon clicking "find" 2602
the ID of the searcher 2603
what here means that the keyword will be searched in any possible data or metadata 2604
clicking "find" will trigger xap.io to search 2605
by clicking "options" 2606. the search form changes by introducing the three-way search by what-when-who; options is highlighted, and clicking "options" when highlighted will return the search form to basic state (keeping in cache any text/selections if made in the options, in case of a change of mind)
what searches in idea names or data 2611
when searches in between first and second date (first blank=−infty, second blank=+infty) 2612
who searches in any person id or name 2613

FIG. 26 also shows preset searches, which are intended to show immediately content that may be common or useful to orient the user:
my ideas: triggers the search of the ideas that have been created by the searcher, as in the browser identification. The most recent ideas in reverse chronological order are returned first. 2621
others' ideas: triggers the search of the most recent ideas created by others' (not creator), and that are permitted to the searcher, as in the browser identification. The most recent ideas in reverse chronological order are returned first. 2622

Search by Relations.

Figure 27:
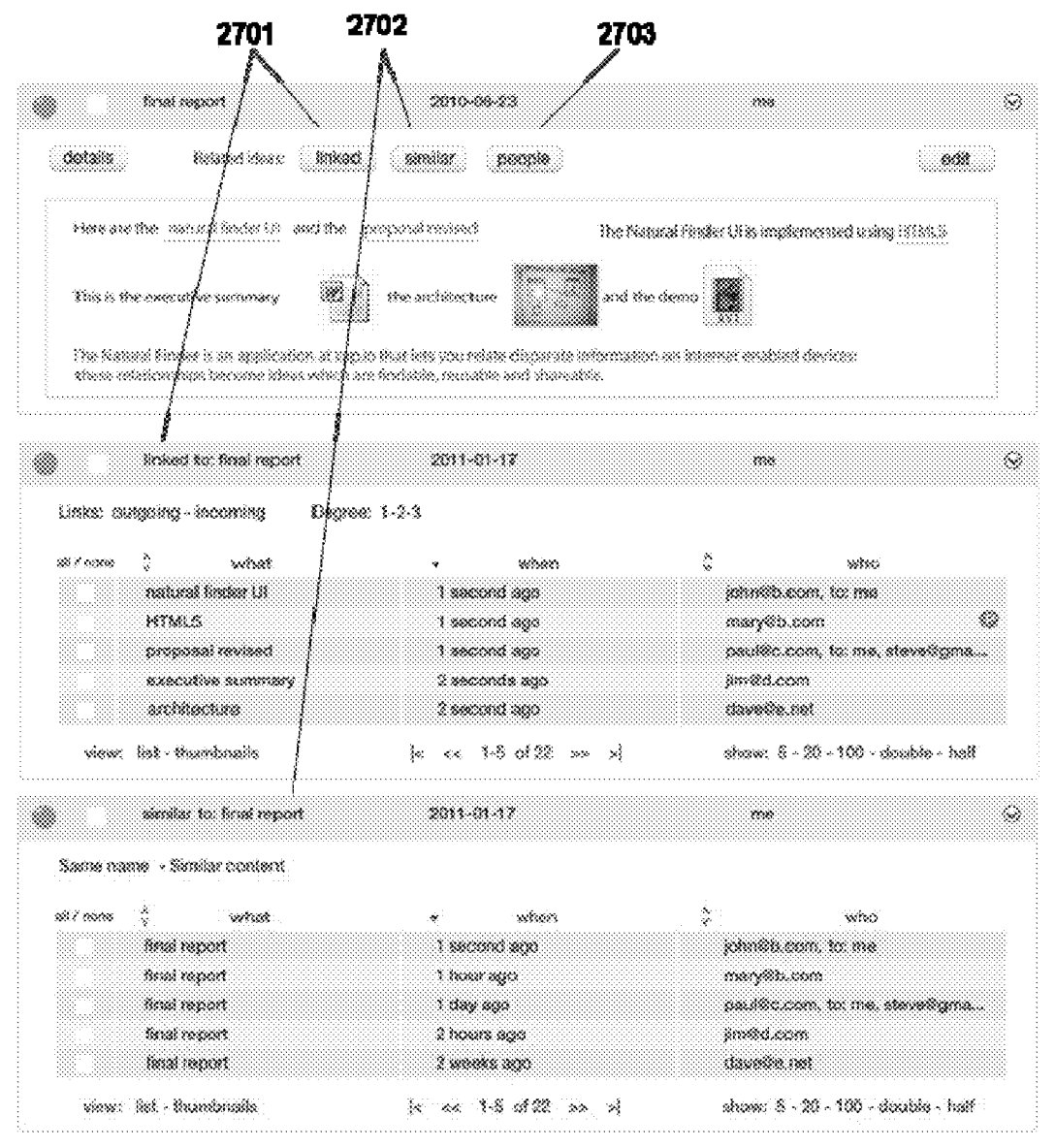

Search by relations originates from navigating from an idea, and seeking the available relations of such idea. FIG. 27 describes the options to find by relations, including thee related options:

Linked 2701 triggers the search of the ideas that are linked to such idea. The default is the search of the links outgoing of such idea, but the concept can be extended to incoming links, and links (in-out) of more than one degree).

Similar 2702 triggers the search of the similar ideas. The default is the search of the versions of the idea with the same name, but the concept can be extended in the future to other definitions of similarity. The results are the version or similarity log, indicating if there are newer and the newest People 2703 triggers the search of related people of the idea (creator and access list); the people may or may not be visible by searcher. Also, the definition of related people may be extended in the future. The list of people may be about who had access, who created, who viewed, etc. providing that the permissions are in place.

Selection and Display of Results.

Figure 28:
FIG. 28 illustrates selecting, hiding, showing, copying, and saving results.

The selection and display of results is better explained with one or more frames with lists of results as in FIG. 28. The user selects results that he wants (or does not want) in order to something about them. Then in the main xap.io toolbar there are options that allow doing operations across the frames. The options are:

show: removes from the display what is not selected
hide: removes from the display what is selected
save: links the selected results into a new idea
copy: combines the selected results and copies them in the xap.io clipboard, so that they can be pasted into an open idea (explained in FIG. 10, 1001 1002).

View an Idea.

Figure 16:
FIG. 16 illustrates viewing a saved idea in the web interface of the system.

Viewing and idea is shown in FIG. 16: a frame that displays an idea, which has the same metadata than at the time of edit:

Name: name as saved
Time: the UDC time stamp
Author: the identification used by creator at the session of creation
Share list: not shown at first glance, but available in details (with restrictions, see later)
Buttons for actions: details related: similar-linked-people edit (not share)
each of them trigger a separate window or frame
view related objects
view related people (only if creator allowed, but then we need to put option at creation)

Enabling Technology Components

Figure 30:
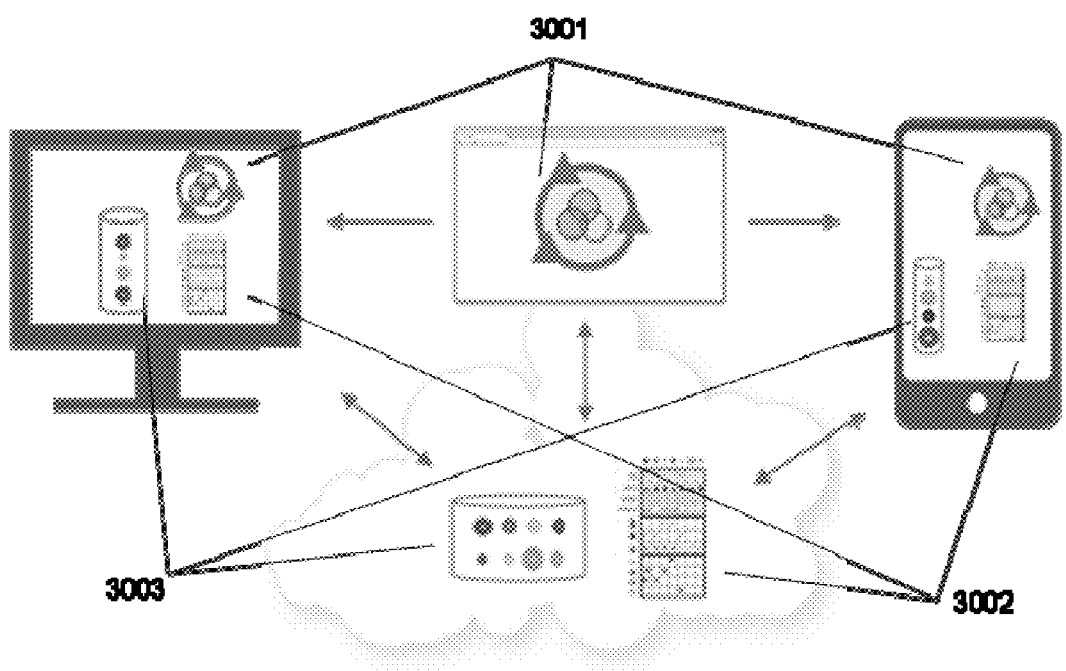
FIG. 30 illustrates the architecture of the system: distributed components of Xdaemon, XMetabase and file storage.

The overall architecture of the system is shown in FIG. 30.

Xdaemon 3001 runs on devices and performs these functions: 1) generate Xids and interact with the local OS to manage the immutability of objects in local storage (make sure files are not changed, or make a copy if an Xid-noncompliant app changes the file); 2) interact with Xdaemons in other devices to arrange which metadata and/or objects to sync; 3) support UI extensions (create-share-find) as plug-ins to apps; and 4) perform local searches in metadata or files, upon request by local user or remote daemons. The Xdaemon enables clients to become object servers; as a result, participating devices contribute to power the distributed system.

Xmetabase 3002 is the notary that records the metadata of the shapshots (Xid, what, when, who, for whom, where it is, what is linked to). The Xmetabase is looked up by the Xdaemon when a user searches the system and also when URIs with an Xid are clicked. What gets returned in a search is the intersection between what matches the query and what is accessible by the identity of the person that has queried.

File storage 3003 is distributed: files can remain in the personal device where they were, or uploaded to the cloud server, or in multiple storage locations. The key point is that each file is treated as immutable, and watched by the Xdaemon. If a file is moved or replicated to other storage devices, it will have the same Xid. At the time of lookup, the Xmetabase knows if it is in localhost, or where it came from, so that it can be requested from there.

Xmetabase. The Xmetabase has the following overall structure.

Figure 31:
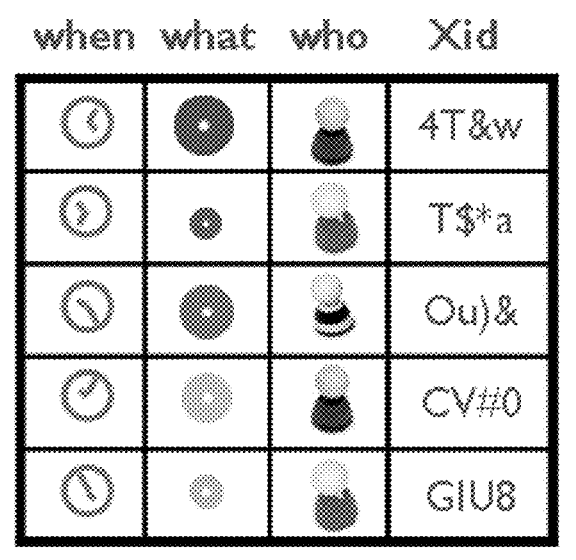

Creation table: (FIG. 31) records the event of creation: what (file), when (UTC), who (author), Xid.

Figure 32:
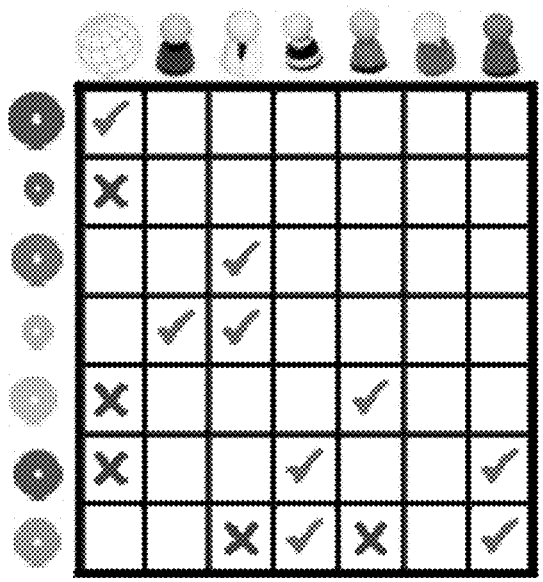
FIG. 32 illustrates the model for the object permission table of Xmetabase.

Permission table: (FIG. 32) The permission table records the intention of permission of an object at the time the author saved it. It consists of the list of people identities (Pid) or ideas (Xid) indicated by the author (before saving the idea) that can find such Xid (based on the permission model and UI described above).

Figure 33:
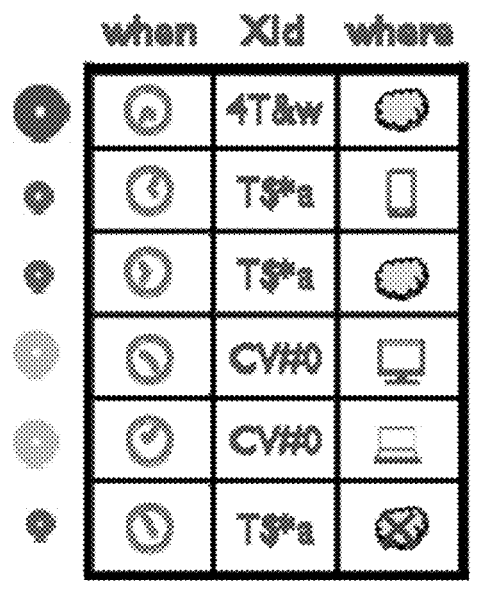

Location table: (FIG. 33) records a storage location for the "what" (file) correspondent to an Xid. Hence, if a "what" is duplicated on other storage, the distributed metabase records a new location for the same Xid (while the local Xdaemon will make sure the "what" is immutable).

Links table: (FIG. 34) records the list of outgoing hyperlinks of an Xid. Some of the hyperlinks can be preexisting Xids, and others may be generated on the fly by the Xdaemon prior to completing the process of saving the idea (see section on creating).

Object equivalence table: (FIG. 35) A person may have and use multiple IDs, which are assigned by different entities. Vice versa, an author can give permission to a person based of one ID known of such person. Identities of people are treated by Xap.io in the same manner as information identities: a snapshot at a certain point in time: therefore, an identity of a person is also an Xid. The object equivalence table is a list of events that record the positive verification of equivalence of two Xids. It is up to a person to prove the equivalence among two or more Xids, in order to aggregate searches in the information space of multiple Xids.

The tables above record information events. Based on them, other tables or real time searches can be constructed in such a distributed metabase. For instance:

verifying if a person presenting an identity has access to an Xid;
finding incoming links known to the system;
finding the duplicate files that have the same Xid; and
determining provenance, i.e. following the directed graph of outgoing links.

Creation. The table of object creation in FIG. 31 records the key metadata of idea creation:

when: the UTC time of saving of the idea
what: the name of the idea (if any, otherwise blank)
who: the identity of the creator (Pid, or in general an Xid)
Xid: the unique global identity of the idea.

Because ideas are immutable, persistent, and global, the Object creation table is a log of events in time.

Permission. The permission of object in FIG. 32 consists of the list of people identities (Pid) or ideas (Xid) indicated by the creator (before saving the idea) that should, must not, or "don't care, it they access such idea. The user expresses, for each idea the permission, the list of Xid or Pid, including the rest of the world. For each idea created, a permission list is generated, with:
list of Xid/Pid=YES
list of Xid/Pid=NO
In addition, the user can indicate:
world=YES, which means that the rest of the world than specifically indicated with Xid/Pid can access (public)
world=NO, which means that the rest of the world, than specifically indicated with Xid/Pid, must not access.

Unless there is a "rest of the world=YES or NO" flag, whatever was not defined means "I don't care". The information can be recorded as a list of events at creation time, but for presentation purposes the permissions are a sparse table. This refers to the permission model that is defined in the sharing user interfaces.

Location. The location of objects in FIG. 3 is a list of events that indicates where an Xid is stored:
when: the time of storing
the Xid
the location: address of hardware, and local address of the idea
an idea can be erased in a location, so that the location has a positive or negative flag.

Figure 34:
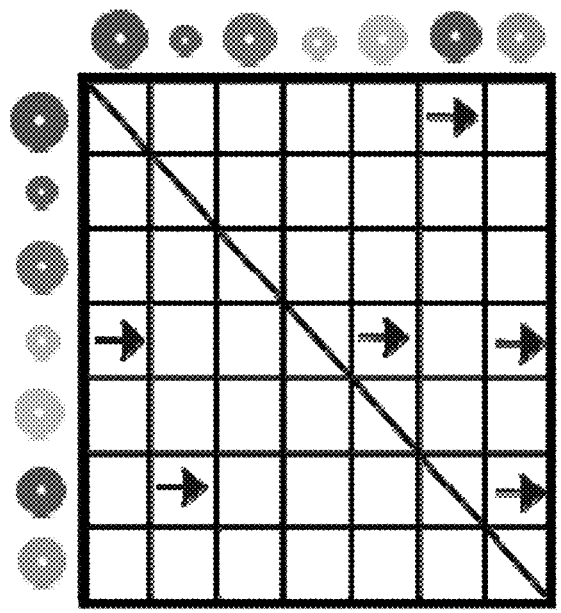
FIG. 34 illustrates the model for the object linking table of Xmetabase.

Notice that an idea can be stored in multiple locations. The description of the Xmetabase defines the logical structure in a distributed nature of the database, and does not involve the distributed implementation details. Permission of object consists of the list of people identities (Pid) or ideas (Xid) indicated by the creator (before saving the idea) that should, must Links. For each idea at creation time, the list of outgoing links is recorded (FIG. 34). Such links can be preexisting, or can be generated when the creator saves the idea, so that all links to external information can be generated prior to completing the process of saving the idea (see section on create and edit). The information can be recorded as a list of events at creation time, but for presentation purposes the permissions are a sparse table.

Person equivalence. Users can identify themselves with different IDs (FIG. 35). Likewise, a creator can give permission to a certain person ID. It is up to a person to prove the equivalence among two or more IDs, in order to aggregate the accessible information space of those IDs in the future. Xap.io will assign an ID to a user or session, and will allow people to perform creation and searches even if an ID is not proven. However, the action are very limited, and proving an ID equivalence will not only aggregate the information spaces, but will also enable to increase the freedom to operate.

Idea equivalence. Likewise to people equivalence, ideas can be stated to be equivalent. This can be done by the system that verifies checksums, or by users that indicate that the objects are equivalent. This helps support the search for same objects, or versions.

Figure 36:
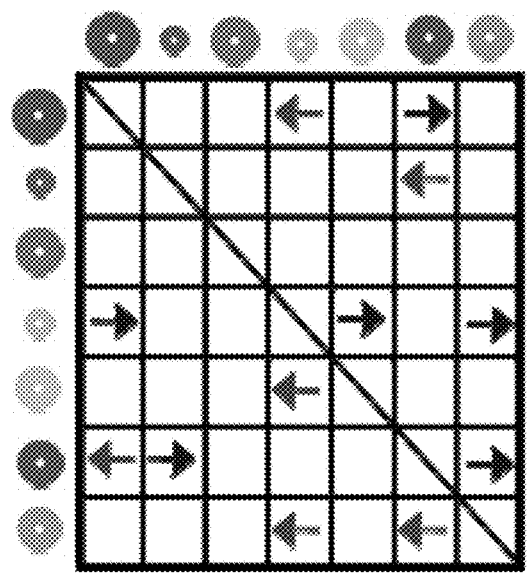
FIG. 36 illustrates the model for the object network table that can be derived in the Xmetabase.

Network. This system can reconstruct the incoming links to selected ideas (FIG. 36). This is an inverse process that is computationally complex and may not lead to all results. Nevertheless, we can think of the sparse symmetric matrix of the network graph of the ideas. Likewise, the system network can reconstruct which people are connected to which, via which idea.

Xdaemon. The daemon is started automatically as the system starts. The daemon asks the OS who the current, logged-on user is: that's the "who" that gets associated to any files and changes in the current session. A file is created and immutably saved for each user selection as described above. Also a file is saved when the user hits "save" in an application, or any application's autosave feature has kicked in. The OS notifies the daemon of the file change (the daemon had previously registered with the OS to receive such notifications).

The daemon takes a snapshot of the file, i.e., makes a copy of the file into the Xdaemon's own private/protected storage (let's call it "cache"). Basically, a file change on disk, as recognized by the OS, is also recognized by the daemon as the user's intention to produce an immutable snapshot of some work in progress. The daemon doesn't know or care whether the Save action performed on the file is simply to prevent loss of data while the data is stored in volatile memory or if it's the user intention to consider the work "done". It's up to the user to decide the level of change granularity recorded by each snapshot.

Now the daemon has also the "what" (the file snapshots): it can start generating Xids as needed (see the process of digital notarization). Based on user general preferences and/or specific requests, as new Xids are generated with all the associated metadata including permissions, etc., the daemon works in the background to synchronize the metadata and possibly the file to another Xap.io service via the cloud.

Xdaemon Process to Capture and Connect.

Under the hood, what happens is that for each object that is related to the idea a global address is assigned, and a record in the local metabase is created including: the object global unique ID, the identification used by the creator (who), the time of creation (when), the name of the object (what), the location in storage where the object is stored (where), a hash that will be used to verify if an object is the same of another (checksum).

All this metadata gets recorded in the global Xmetabase, and the record gets synchronized as soon as possible between the device and the cloud (similar to DNS). In addition, the Xmetabase adds the record of how the links among the idea and the objects hyperlinked to it. The objects (files) that are related to the ideas may remain in the storage of the device where they were or get created: the important thing is that those objects are flagged as referenced by the global addressing system, so that they are not modified by other applications, or if they are, the global addressing system knows that they are not the original ones anymore. The objects may or may not synchronize with another storage, based on efficiency and business criteria (to be explained elsewhere).

Generation of Metadata.
When save button is clicked:
Xdaemon freezes state of an information object (shapshot)
Xdaemon generates a global unique ID for the information object
Xdaemon generates a record of metadata containing:
the object global unique ID
a hash of the information object (what)
the title of the object
the time of creation (when)
the identification used by the creator (who)
the sharing intention (whom)
the location in the local storage where the object is stored (where)
flag of sync with xap.io distributed system (initially false).
If there are nested information objects, the process is recursively applied to the nested objects Local control of files with OS.
the daemon has control of some original file
if the file is going to be changed the following process takes place:
the changed file is saved in a temporary location
the OS notifies the xap.io daemon of the impending change the daemon takes a copy of the file in the current state
the OS moved the new version of the file from the temporary location to the final location Sync with Distributed Xap.io.
Look in the metadata list which records need sync
Look at the user account record whether file needs duplication to cloud
Sync metadata
Possibly sync file The Distributed Notarization System.

The method and system can be extended to be a "notary" service to generate global unique Xids in a distributed manner. Given more than one Xdaemon, the process of distributed notarization can be based on Trusted Time Stamping.

Here's how the daemon on the device works with the Xap.io service, acting as the notary, to assign an "identity" (more precisely, a "global identity", or Xid) to a new piece of information (let's call it simply a "file").

The goal is to avoid forcing the user or the Xdaemon to deal with encryption of the whole file for the simple task of generating the Xid notarization of the file.

The following protocol allows the Xap.io service to give the file an unchangeable, verifiable identity without the Xap.io service ever seeing the file itself.

Daemon requests Xap.io to "notarize" a newly created file F. F is then the "what" that Daemon and Xap.io will be dealing with.

Xap.io returns a timestamp TS to Daemon. Xap.io keeps its own copy of TS pending. At this point, Xap.io and Daemon are also agreeing on the "when" part.

TS is a structure or three separate timestamps provided by different, trusted NTP (Network Time Protocol) servers, plus a hash of the three timestamps. The three timestamps must, of course, match within some given tolerance. The NTP protocol provides ways for Xap.io to request trustable timestamps, i.e. timestamps that have some proof of validity and authenticity attached to them.

[Note: TS is exchanged over a secure connection. TS is not confidential, but a man in the middle attack on a non-secure connection at this point could sabotage the whole notarization process by altering TS. The same applies to the rest of the data exchanges listed below.]

Daemon computes a hash DH of the concatenation of F and TS. Actually, the daemon may compute, say, three different hashes to reduce the chances of weaknesses in the hash algorithms being exploited to alter the file and still satisfy the hash checking process.

Daemon sends Xap.io DH, TS, and some additional metadata MD that include, at a minimum, F's owner ("who"), F's location (hostname:/path/to/file), and the owner's original sharing intention regarding F (private, shared—with whom, public, etc.).

Xap.io matches the TS+DH+MD it just got from Daemon to the TS it was keeping pending, and updates its notary records with the full record TS+DH+MD.

[Note: If Xap.io doesn't receive the information it expects within some predefined delay after TS, TS is invalidated. The Daemon is notified that it has to restart the process all over again.]

Xap.io uses some combination of DH, TS, and MD, to generate the Xid and the Xap.io hash for F, and sends DH+Xid to Daemon.

Daemon matches the DH+Xid it just got to the DH it had, and updates its records regarding F accordingly.

Now both Daemon and Xap.io have copies of Xid, TS, DH, and MD, and Xap.io never had to see F's contents.

Suppose that, at some later time, some entity X challenges the ownership of F by the true owner TO, X may claim to have created F first, for example. Both X and TO provide their set of Xid, DH, TS, and MD to Xap.io. By checking its records, Xap.io can:
verify that X's and TO's instances of F had in fact been correctly notarized, and
which instance of F had been notarized first, X's or TO's.
At this point, new data+metadata have been added to the Xap.io system.

The Xid Protocol.

The Xid protocol meets the following requirements.

Distributed and scalable. The protocol and identity space is scalable to capture information snapshots generated by billions of people at high frequency rate. In addition, the protocol is distributed to enable the generation of Xids asynchronously.

Compatible with the Internet/Web technology. The protocol based on this model: Xid is added to internet addresses (URI). For instance: [file.doc] saved by [Author] at [UTC time] will have an Xid=[protocol TBD] and a corresponding hash=[u9T3Gjs2]. The file can be served as https://xap.io/u9T3Gjs2/ and also as https://www.whatever.com/u9T3Gjs2/ This supports the goal of having the same Xid even if the object is replicated with no change.

Superseding other information identifiers. There are several information object identifiers that are used in specific environments. Examples are: Digital Object Identifier and the Handle.net, ISBN for books, etc. The Xid would be generated so that it contains the existing identifier, and the identity of the identifier system.

Email Attachment Embodiment of the Capture and Connect System

Definitions potential attachments: files that are being attached by the user into an email message, by drag&drop, insert, attach, copy&paste, or all files attached to a message that are being forwarded)
plugin state: the plugin has a state that is either enabled=linked, or disabled=attached
linked: the potential attachments are placed as web links in the message body (see link details)
attached: the potential attachments are attached as would normally happen in email.

Plugin state: Once installed, the email plugin has a state that is either:
enabled: potential attachments get linked
disabled: potential attachments get attached Plugin Toolbar:
Toolbar for email client window (controls, lists, not new messages):
Xap.io Files are: |linked|attached|
toolbar for new message (new, forwarded, replied):
Xap.io Files are: |linked|attached| Message is: |published| [push icons]
Xap.io=window pull down image: the combo pulls down Xap.io options (see later)
"Files are": is dummy text
"linked" and "attached" are radio buttons reflecting the plugin state, respectively "enabled" and "disabled", and also actionable so the user can change the state.
If user clicks on the unselected button of the two, the plugin state is switched: as a result, the selected and unselected switch.

If user clicks on selected, nothing changes
"Message is": is dummy text
"published" is an on/off state that indicates that that specific message and its links are published
"published" is off by default when new message is opened, and only the user can change
the user can click to change state: turn it on, and re-click it to turn off, and so on.
"published" can be turned on/off during message editing, regardless of the state of linked or attached
if "published" is off when the hen the message is sent, the publishing flag will be off
if "published" is on when the hen the message is sent, them the message and it's direct links will be flagged on for publishing in the metabase
eventual attachments in a message that was "published" are not published
Link generation and placement is done for each and every file that:
was attached in a message being forwarded
is attached in a new message via drag&drop, copy&paste, attach, insert, etc.
As a result, there is a link for each file inserted, in addition to the link to the message that may not be inserted in the message itself.

Other Embodiments

Other digital computer system configurations can also be employed to perform the method of our techniques, and to the extent that a particular system configuration is capable of performing the method of our techniques, it is equivalent to the digital computer system described here, and within the scope and spirit of our techniques.

Once they are programmed to perform particular functions pursuant to instructions from program software that implements the method of our techniques, such digital computer systems in effect become special-purpose computers particular to the method of our techniques. The techniques necessary for this are well-known to those skilled in the art of computer systems.

Computer programs for creating the special-purpose computer supporting the method of our techniques will commonly be distributed to users on a non-transitory distribution medium such as floppy disk or CD-ROM. From there, they will often be copied to a hard disk, flash memory, or a similar intermediate storage medium. When the programs are to be run, they will be loaded either from their distribution medium or their intermediate storage medium into the execution memory of the computer, configuring the computer to support the method of our techniques. All these operations are well-known to those skilled in the art of computer systems.

The term "non-transitory computer-readable medium" encompasses non-transitory distribution media, intermediate storage media, execution memory of a computer, and any other non-transitory medium or device capable of storing for later reading by a computer a computer program implementing the method of our techniques.

It is to be understood that the above described embodiments are merely illustrative of numerous and varied other embodiments which may constitute applications of the principles of our techniques. Such other embodiments may be readily devised by those skilled in the art without departing from the spirit or scope of our techniques and it is our intent they be deemed within the scope of our invention.

I claim:

1. A method of immutably copying a selection of content from a displayed document to a second document, comprising:
   (a) selecting content from the current display of the application program;
   (b) copying the selected content to a clipboard;
   (c) in conjunction with the copying of the selected content and with no human intervention, performing the following steps:
      (c1) creating a screengrab of the displayed document,
      (c2) saving the screengrab on a server computer,
      (c3) and obtaining a URL for the saved screengrab,
      (c4) modifying the clipboard information to include the URL of the saved screengrab;
   (d) in conjunction with the copying of the selected content and with no human intervention, performing the following steps:
      (d1) saving a copy of the displayed document on a server,
      (d2) obtaining a URL for the saved copy; and
      (d3) modifying the clipboard information to include the URL of the saved copy of the displayed document: and
   (e) pasting the modified clipboard information into the second document.

2. The method of claim 1, where the selected content from a displayed document is the entire document.

3. The method of claim 1, where the URL for the saved screengrab is generated by the server.

4. The method of claim 1, where the URL for the saved screengrab is generated on the user's computer.

5. The method of claim 1, where the URL for the saved copy of the displayed document is generated by the server.

6. The method of claim 1, where the URL for the saved copy of the displayed document is generated on the user's computer.

7. A method of immutably copying a selection of web browser content to a document, comprising:
   (a) selecting content from a web page currently being displayed by the web browser;
   (b) copying the selected content to a clipboard;
   (c) in conjunction with the copying of the selected content and with no human intervention, performing the following steps:
      (c1) determining the URL of the web page,
      (c2) and modifying the clipboard information to include the URL of the web page;
   (d) in conjunction with the copying of the selected content and with no human intervention, performing the following steps:
      (d1) creating a screengrab of the web page as displayed by the web browser,
      (d2) saving the screengrab on a server computer,
      (d3) obtaining a URL for the saved screengrab,
      (d4) and modifying the clipboard information to include the URL of the saved screengrab;
   (e) in conjunction with the copying of the selected content and with no human intervention, performing the following steps:
      (e1) saving HTML of the selected content on a server computer;
      (e2) obtaining a URL for the saved HTML,
      (e3) and modifying the clipboard information to include the URL for the saved HTML; and
   (f) pasting the modified clipboard information into the document.

8. The method of claim 7, where the URL for the saved HTML is generated by the server.

9. The method of claim 7, where the URL for the saved HTML is generated on the user's computer.

10. The method of claim 7, where the saved HTML is the entire web page.

* * * * *